United States Patent
Fukuda et al.

(10) Patent No.: US 7,292,372 B2
(45) Date of Patent: Nov. 6, 2007

(54) IMAGE PROCESSING APPARATUS AND IMAGE FORMING APPARATUS WHICH ADAPTIVELY SWITCHES IMAGE PROCESSING METHODS BETWEEN A DOT IMAGE PORTION AND A NON-DOT IMAGE PORTION

(75) Inventors: Hiroaki Fukuda, Kanagawa (JP); Hiroyuki Kawamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 973 days.

(21) Appl. No.: 10/373,778

(22) Filed: Feb. 27, 2003

(65) Prior Publication Data

US 2003/0184808 A1 Oct. 2, 2003

(30) Foreign Application Priority Data

| Feb. 28, 2002 | (JP) | ............................ 2002-054161 |
| Mar. 19, 2002 | (JP) | ............................ 2002-076145 |
| Feb. 20, 2003 | (JP) | ............................ 2003-043037 |

(51) Int. Cl.
   H04N 1/40 (2006.01)
   G06K 15/02 (2006.01)

(52) U.S. Cl. ..................... 358/2.1; 358/462; 382/176

(58) Field of Classification Search ................ 382/173, 382/176; 358/462, 3.01, 3.06, 3.08, 3.21, 358/3.24, 3.27, 2.1
See application file for complete search history.

(56) References Cited

U.S. PATENT DOCUMENTS

| 4,722,008 A | | 1/1988 | Ibaraki et al. |
| 4,953,013 A | * | 8/1990 | Tsuji et al. .................. 358/530 |
| 5,193,122 A | | 3/1993 | Kowalski et al. |
| 5,687,006 A | * | 11/1997 | Namizuka et al. .......... 358/462 |
| 5,920,646 A | | 7/1999 | Kamon |
| 5,995,658 A | * | 11/1999 | Hanyu ......................... 382/176 |
| 2001/0012113 A1 | 8/2001 | Yoshizawa et al. |
| 2001/0012127 A1 | 8/2001 | Fukuda et al. |
| 2001/0015821 A1 | 8/2001 | Namizuka et al. |
| 2001/0019429 A1 | 9/2001 | Oteki et al. |
| 2001/0021034 A1 | 9/2001 | Suzuki et al. |
| 2001/0021278 A1 | 9/2001 | Fukuda et al. |
| 2001/0050778 A1 | 12/2001 | Fukuda et al. |
| 2001/0054126 A1 | 12/2001 | Fukuda et al. |
| 2002/0012131 A1 | 1/2002 | Oteki et al. |
| 2002/0018244 A1 | 2/2002 | Namizuka et al. |
| 2002/0027670 A1 | 3/2002 | Takahashi et al. |
| 2002/0054374 A1 | 5/2002 | Inoue et al. |
| 2002/0191694 A1 | 12/2002 | Ohyama et al. |
| 2002/0196470 A1 | 12/2002 | Kawamoto et al. |
| 2003/0090742 A1 | 5/2003 | Fukuda et al. |

FOREIGN PATENT DOCUMENTS

| JP | 61-194968 | 8/1986 |
| JP | 5-207282 | 8/1993 |

* cited by examiner

*Primary Examiner*—Thomas D. Lee
(74) *Attorney, Agent, or Firm*—Dickstein Shapiro LLP

(57) ABSTRACT

An image processing apparatus is provided with a detector for detecting a dot image portion or a non-dot image portion from a binarized image data representing an image, and an image processing section for carrying out a different image processing with respect to the binarized image data depending on a detection result of the detector.

24 Claims, 18 Drawing Sheets

IMAGE PROCESSING APPARATUS AND IMAGE FORMING APPARATUS WHICH ADAPTIVELY SWITCHES IMAGE PROCESSING METHODS BETWEEN A DOT IMAGE PORTION AND A NON-DOT IMAGE PORTION

BACKGROUND OF THE INVENTION

This application claims the benefit of Japanese Patent Applications No. 2002-054161 filed Feb. 28, 2002, No. 2002-076145 filed Mar. 19, 2002 and No. 2003-043037 filed Feb. 20, 2003, in the Japanese Patent Office, the disclosures of which are hereby incorporated by reference.

FIELD OF THE INVENTION

The present invention generally relates to image processing apparatuses and image forming apparatuses, and more particularly to an image processing apparatus and an image forming apparatus which adaptively switches an image processing method between an image portion (hereinafter referred to as a dot image portion) which is represented by dots and an image portion (hereinafter referred to as a non-dot image) which is other than the dot image portion, of a binarized image. The image forming apparatus includes a copying machine, a facsimile machine, a printer and the like.

DESCRIPTION OF THE RELATED ART

In the image forming apparatus such as the copying machine and the facsimile machine, an image data which is obtained by reading a document is subjected to an image processing suited for copying the document image. The image processing includes a conversion process which obtains a multi-valued (multi-level) digital image data by subjecting the image data to an analog-to-digital (A/D) conversion, a shading correction process carried out with respect to the multi-valued digital image data, a filtering process such as smoothing (or jaggy correction) and edge emphasis, a correction process which carries out a γ-correction or the like, and a gradation process which obtains a binarized image data by subjecting the corrected multi-valued digital image data to a gradation process. The binarized image data is supplied to a plotter which forms the image of the original document onto a recording medium such as paper.

The document image is not limited to a non-dot image such as characters and lines, but also includes a dot image which represents the gradation by a collection of dots as in the case of dot (or halftone) photographs. In addition, both the non-dot image portion and the dot image portion may coexist within the document image. Accordingly, in the case of the document in which the non-dot image portion and the dot image portion coexist, it is necessary to carry out different image processings between the non-dot image portion and the dot image portion. In other words, it is necessary to carry out an image processing suited for the dot image with respect to the dot image portion, and an image processing carried out with respect to the non-dot image cannot be applied as is with respect to the dot image portion.

For this reason, a conventional image forming apparatus is provided with a first processing circuit for the dot image portion, a second processing circuit for the non-dot image portion, and an identifying circuit for identifying the dot image portion and the non-dot image portion from the multi-valued digital image data. An output of the first processing circuit is selected when the identifying circuit identifies the dot image portion, and an output of the second processing circuit is selected when the identifying circuit identifies the non-dot image portion.

Conventionally, various methods have been proposed to identify the non-dot image portion and the dot image portion from the multi-valued digital image data. For example, according to a method proposed in a Japanese Laid-Open Patent Application No.61-194968, the dot image portion is identified from the image for every block which is made up of 4×4 pixels. The pixels within the block are successively accessed in a main scan direction and a sub scan direction in a predetermined course, and a level difference is obtained between two mutually adjacent pixels along the course. Then, a number of transitions of the sign (positive or negative) of the level difference in the course is obtained for the main scan direction and the sub scan direction. When the number of transitions in the main scan direction and the sub scan direction is greater than or equal to a predetermined number, it is judged that the block is a dot image portion.

On the other hand, various smoothing methods have been proposed, such as a method proposed in a Japanese Laid-Open Patent Application No.5-207282.

When supplying the binarized image data which is obtained as a result of the image processing described above so as to form an image on the recording medium, the picture quality of the image formed on the recording medium is determined by the image processing. However, the picture quality of the image formed on the recording medium may not be sufficiently high by merely carrying out the image processing, and in some cases, it is desirable to form the image with a higher picture quality.

In other words, the filtering process with respect to the multi-valued digital image data includes smoothing, edge emphasis and the like, but even when the smoothing is carried out with respect to the multi-valued digital image data, there is a problem in that the picture quality of the image formed on the recording medium cannot always be improved. In addition, when the same smoothing is carried out with respect to both the non-dot image portion and the dot image portion of the multi-valued digital image data, the shape of the dot image portion changes, and there is a problem in that the picture quality is greatly deteriorated due to deteriorated gradation and gradation reversal of the image formed on the recording medium. Furthermore, these problems are also generated when the image data subjected to the smoothing is supplied to a display apparatus to form, that is, display, an image on the display apparatus.

SUMMARY OF THE INVENTION

Accordingly, it is a general object of the present invention to provide a novel and useful image processing apparatus and image forming apparatus, in which the problems described above are eliminated.

Another and more specific object of the present invention is to provide an image processing apparatus and an image forming apparatus, which can always carry out an optimum image processing such as smoothing, regardless of whether an image is a non-dot image or a dot image, so that a picture quality of an image which is formed is improved.

Still another object of the present invention is to provide an image processing apparatus comprising a detector detecting a dot image portion or a non-dot image portion from a binarized image data representing an image, and an image processing section carrying out a different image processing with respect to the binarized image data depending on a detection result of the detector. According to the image processing apparatus of the present invention, it is always possible to carry out an optimum image processing such as smoothing, regardless of whether the image is a dot image or a non-dot image, thereby making it possible to improve the picture quality of the image which is to be formed.

A further object of the present invention is to provide an image forming apparatus comprising an image processing apparatus including a detector detecting a dot image portion or a non-dot image portion from a binarized image data representing an image, and an image processing section carrying out a different image processing with respect to the binarized image data depending on a detection result of the detector; and an image forming section forming an image on a recording medium based on an output of the image processing section. According to the image forming apparatus of the present invention, it is always possible to carry out an optimum image processing such as smoothing, regardless of whether the image is a dot image or a non-dot image, thereby making it possible to improve the picture quality of the image which is formed.

Other objects and further features of the present invention will be apparent from the following detailed description when read in conjunction with the accompanying drawings.

DESCRIPTION OF THE PREFERRED EMBODIMENTS

Figure 1:
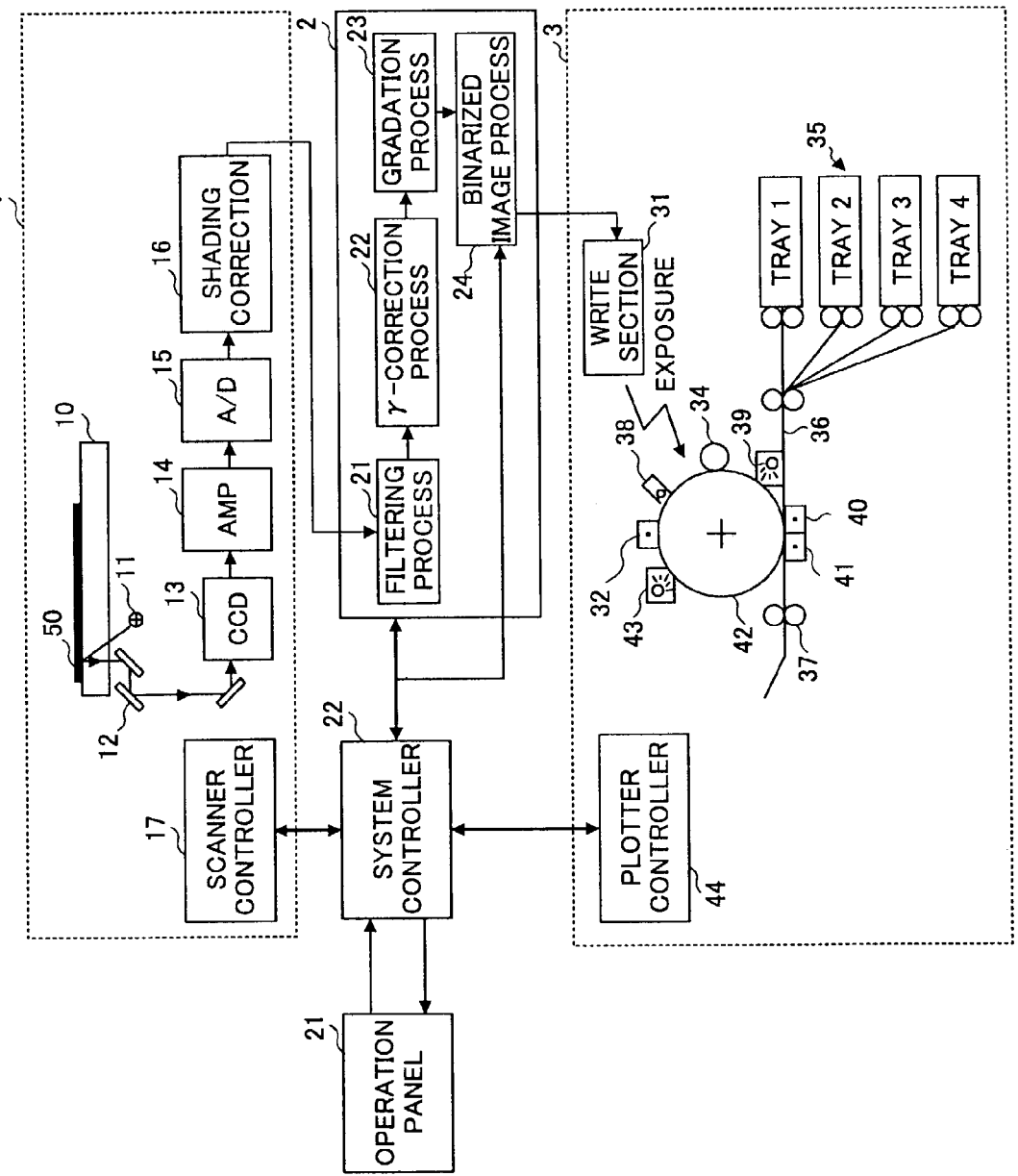
FIG. 1 is a system block diagram showing a structure of a first embodiment of an image forming apparatus according to the present invention.

The present inventors have found that, of the filtering process conventionally carried out with respect to the multi-valued digital image data, the smoothing (jaggy correction) can more directly contribute to picture quality improvement when carried out with respect to the binarized image data which has been subjected to the image processing and is supplied to the plotter or the like.

Hence, in the present invention, the smoothing is carried out with respect to the binarized image data which is obtained by subjecting the multi-valued digital image data to the image processing, so as to improve the picture quality of the image which is formed.

In addition, when carrying out the smoothing with respect to the binarized image data, it is desirable to carry out different smoothings between the non-dot image portion and the dot image portion. For this reason, the present invention identifies the non-dot image portion and the dot image portion of the binarized image data, and carries out an appropriate smoothing with respect to each of the non-dot image portion and the dot image portion, based on the identified result. However, the method proposed in the Japanese Laid-Open Patent Application No.61-194968 identifies the non-dot image portion and the dot image portion from the multi-valued digital image data, and cannot be used to identify the non-dot image portion and the dot image portion from the binarized image data. Accordingly, the present invention extracts the image data from the binarized image data using a window having a size of N×1 pixels, that is, N pixels existing in the main scan direction. When a total number of transition points within the window, including transition points of the binary image data from a white pixel to a black pixel and from a black pixel to a white pixel, is greater than or equal to a predetermined threshold value, it is judged that the image portion within the window is a dot image portion. Hence, it is possible to positively identify the non-dot image portion and the dot image portion from the binarized image data. Therefore, when carrying out the smoothing with respect to the binarized image data, it is possible to adaptively switch between a smoothing for the non-dot image portion and a smoothing for the dot image portion, depending on the identified result. Consequently, it is possible to always carry out an optimum smoothing, regardless of whether the image is a non-dot image or a dot image, and the picture quality of the image which is formed can be improved.

Next, a description will be given of various embodiments of the image processing apparatus according to the present invention and the image forming apparatus according to the present invention, by referring to the drawings.

FIG. 1 is a system block diagram showing a structure of a first embodiment of the image forming apparatus according to the present invention. This first embodiment of the image forming apparatus employs a first embodiment of the image processing apparatus according to the present invention. In this embodiment, the present invention is applied to a copying machine, however, it is of course possible to similarly apply the present invention to a facsimile machine, a printer or the like.

The image forming apparatus shown in FIG. 1 includes a read section 1, an image processing section 2 and an image forming section (plotter) 3. The image processing section 2 corresponds to the first embodiment of the image processing apparatus. In this embodiment, a system controller 22 provided with an operation panel 21 is connected to the read section 1, the image processing section 2 and the image forming section 3.

The read section 1 includes a base 10 on which a document 50 having a document image is placed with the document image facing down, a lamp 11, mirrors 12, a CCD sensor 13, an amplifier 14, an A/D converter 15, a shading correction process unit 16, a scanner controller 17 and the like.

The image processing section 2 includes a filtering process unit 21, a γ-correction process unit 22, a gradation process unit 23, a binarized image process unit 24 and the like.

The image forming section 3 includes a write section 31, a charger 32, a photoconductive body 33, a developing sleeve 34, a plurality of paper supply trays 35, a fixing unit 37, an eraser 38, a pretransfer discharge lamp 39, a transfer charger 40, a separation charger 41, a cleaning unit 42, a discharge lamp 43, a plotter controller 44 and the like. A recording medium 36 is made of paper or the like, and has a surface onto which an image is transferred.

The read section 1 reads the document image of the document 50, and outputs a multi-valued digital image data. More particularly, the lamp 11 irradiates a scanning light on the document 50, and the reflected light from the surface (document surface) of the document 50 is received by the CCD sensor 13 via the mirrors 12. The CCD sensor 13 converts the received reflected light into an electrical signal representing the document image. This electrical signal is subjected to an amplitude adjustment in the amplifier 14, and is quantized by the A/D converter 15. The A/D converter 15 outputs the multi-valued digital image data which is supplied to the shading correction process unit 16. The shading correction process unit 16 subjects the multi-valued digital image data to a known shading correction process for correcting a scanning characteristic of the scanning light, and an output multi-valued digital image data is supplied to the image processing section 2. The scanner controller 17 controls the operation of various parts within the read section 1 under control of the system controller 22. The basic structure itself of the read section 1 is known. Of course, the basic structure of the read section 1 is not limited to that shown in FIG. 1.

In the image processing section 2 which receives the multi-valued digital image data from the shading correction process unit 16, the filtering process unit 21 carries out a known filtering process such as edge emphasis with respect to the multi-valued digital image data. The γ-correction process unit 22 carries out a known γ-correction process with respect to the multi-valued digital image data output from the filtering process unit 21. The gradation process unit 23 carries out a known gradation process with respect to the multi-valued digital image data output from the γ-correction process unit 22, so as to convert the multi-valued digital image data into a binarized image data. The binarized image data output from the gradation process unit 23 is supplied to the binarized image process unit 24, and is subjected to a binarized image processing including smoothing (jaggy correction). A description of this binarized image processing will be given later.

The image forming section 3 forms the document image of the document 50 which is read by the read section 1, onto the recording medium 36, based on the binarized image data supplied from the image processing section 2. More particularly, the write section 31 converts the binarized image data into a laser beam dependent on data values, and scans the photoconductive body 33 which is charged by the charger 32. Hence, an electrostatic latent image dependent on the binarized image data is formed on the surface of the photoconductive body 33. The electrostatic image is developed into a toner image by the developing sleeve 34. The toner image formed on the surface of the photoconductive body 33 is transferred onto the surface of the recording medium 36 which is transported from the paper supply tray 35, by the operation of the pretransfer discharge lamp 39, the transfer charger 40 and the separation charger 41. The toner image is fixed on the surface of the recording medium 36 by the fixing unit 37, and the recording medium 36 is ejected from the image forming section 3. The residual toner on the surface of the photoconductive body 33 is cleaned by the cleaning unit 42. In addition, prior to the charging by the charger 32, the eraser 38 erases the data written on the surface of the photoconductive body 33, and the discharge lamp 43 discharges the surface of the photoconductive body 33. The plotter controller 44 controls the operation of various parts within the image forming section 3 under control of the system controller 22. The basic structure itself of the image forming section 3 is known. Of course, the basic structure of the image forming section 3 is not limited to that shown in FIG. 1.

In this embodiment, the present invention is applied to the copying machine, and thus, the operation panel 21 and the system controller 22 form a part of the image forming apparatus. However, in a case where the operation panel 21 and the system controller 22 form an external unit which is externally connected to the image forming apparatus, the image processing section 2 and the image forming section 3 may operate as a printer which operates under control of the system controller 22 (external unit). In this case, the system controller 22 forms a host unit which is made up of a personal computer or the like, and the read section 1 may be omitted. In addition, when the image processing section 2 and the image forming section 3 operates as a printer and a print data supplied from the system controller 22 (host unit) is a binarized image data, the print data may be supplied directly to the binarized image process unit 24 within the image processing section 2.

Figure 2:
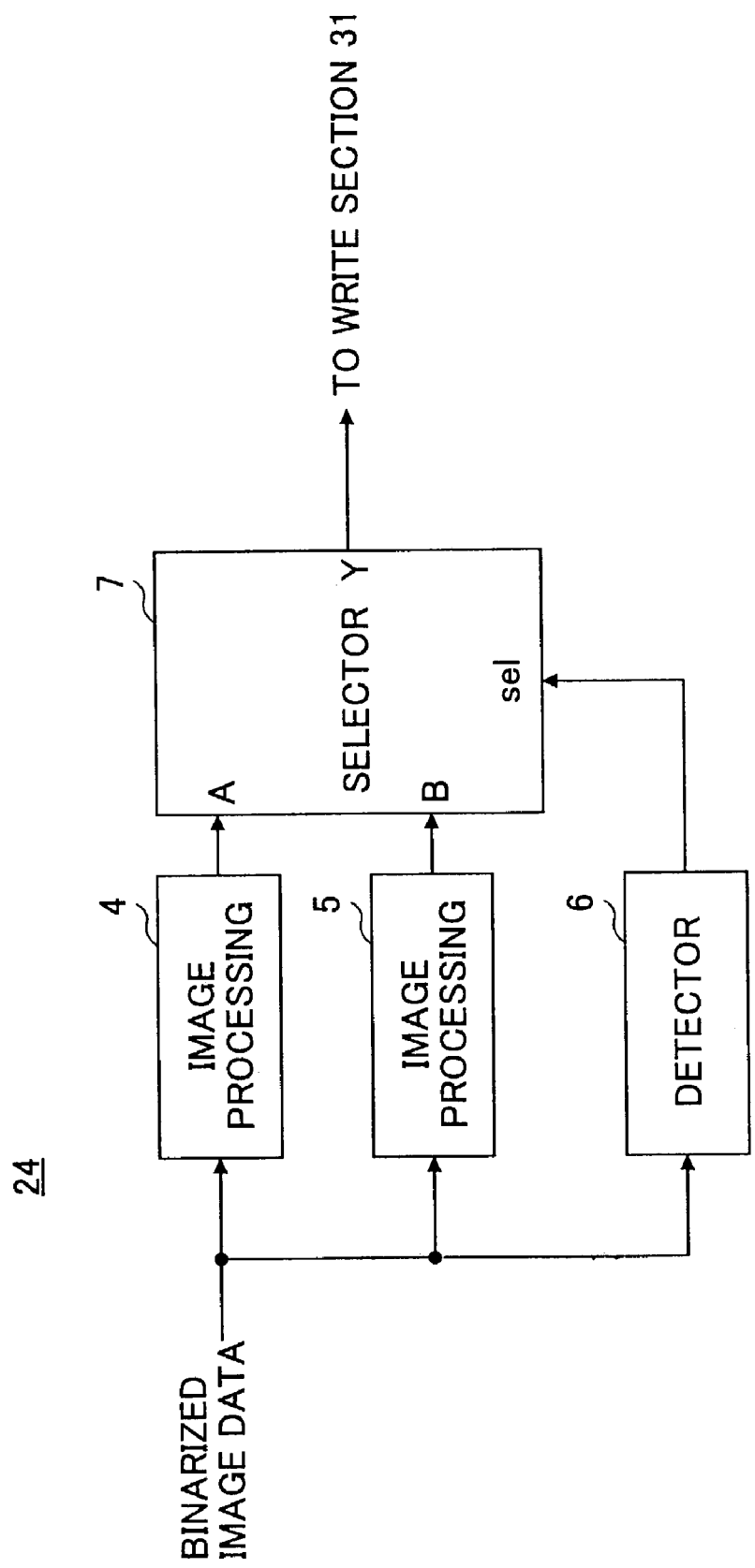
FIG. 2 is a system block diagram showing a structure of a first embodiment of a binarized image processing section.

FIG. 2 is a system block diagram showing a structure of a first embodiment of the binarized image process unit 24. The binarized image process unit 24 includes an image processor 4 for dot image portion, an image processor 5 for non-dot image portion, a dot image portion detector 6, and a selector 7 which are connected as shown in FIG. 2.

The binarized image data output from the gradation process unit 23 shown in FIG. 1 is supplied to the image processors 4 and 5 and the dot image portion detector 6. The image processor 4 subjects the binarized image data to an image processing such as smoothing that is suited for the dot image portion, and the image processor 5 subjects the binarized image data to an image processing such as smoothing that is suited for the non-dot image portion. Output binarized image data of the image processors 4 and 5 are input to corresponding input terminals A and B of the selector 7. The dot image portion detector 6 detects the dot image portion within the binarized image data. When the dot image portion detector 6 detects the dot image portion, the dot image portion detector 6 supplies a selection signal to a selection terminal sel of the selector 7 so as to selectively output the binarized image data input to the input terminal A from an output terminal Y of the selector 7. On the other hand, when no dot image portion is detected, the dot image portion detector 6 supplies a selection signal to the selection terminal sel of the selector 7 so as to selectively output the binarized image data input to the input terminal B from the output terminal Y of the selector 7. The binarized image data which is output from the output terminal Y of the selector 7 is supplied to the write section 31 within the image forming section 3 shown in FIG. 1.

Next, a description will be given of a case where the image processing carried out in the image processors 4 and 5 is smoothing. The smoothing smoothes edges of characters and line portions included in the image. But when the smoothing is excessively carried out with respect to the dot image portion, the shape of the dots may become distorted, and the gradation levels may deteriorate, to thereby deteriorate the picture quality. In other words, the gradation levels in the dot image portion is represented depending on the size and density of the dots, but when the shape of the dots become distorted, it may become impossible to distinguish a space between the dots, to thereby change the gradation level. Accordingly, the smoothing carried out with respect to the binarized image data in the image processor 4 for dot image portion is set weaker when compared to that carried out in the image processor 5 for non-dot image portion. As a result, it is possible to adaptively carry out the smoothing with respect to the dot image portion and the non-dot image portion of the binarized image data, by controlling the selector by the dot image portion detector 6.

Figure 3:
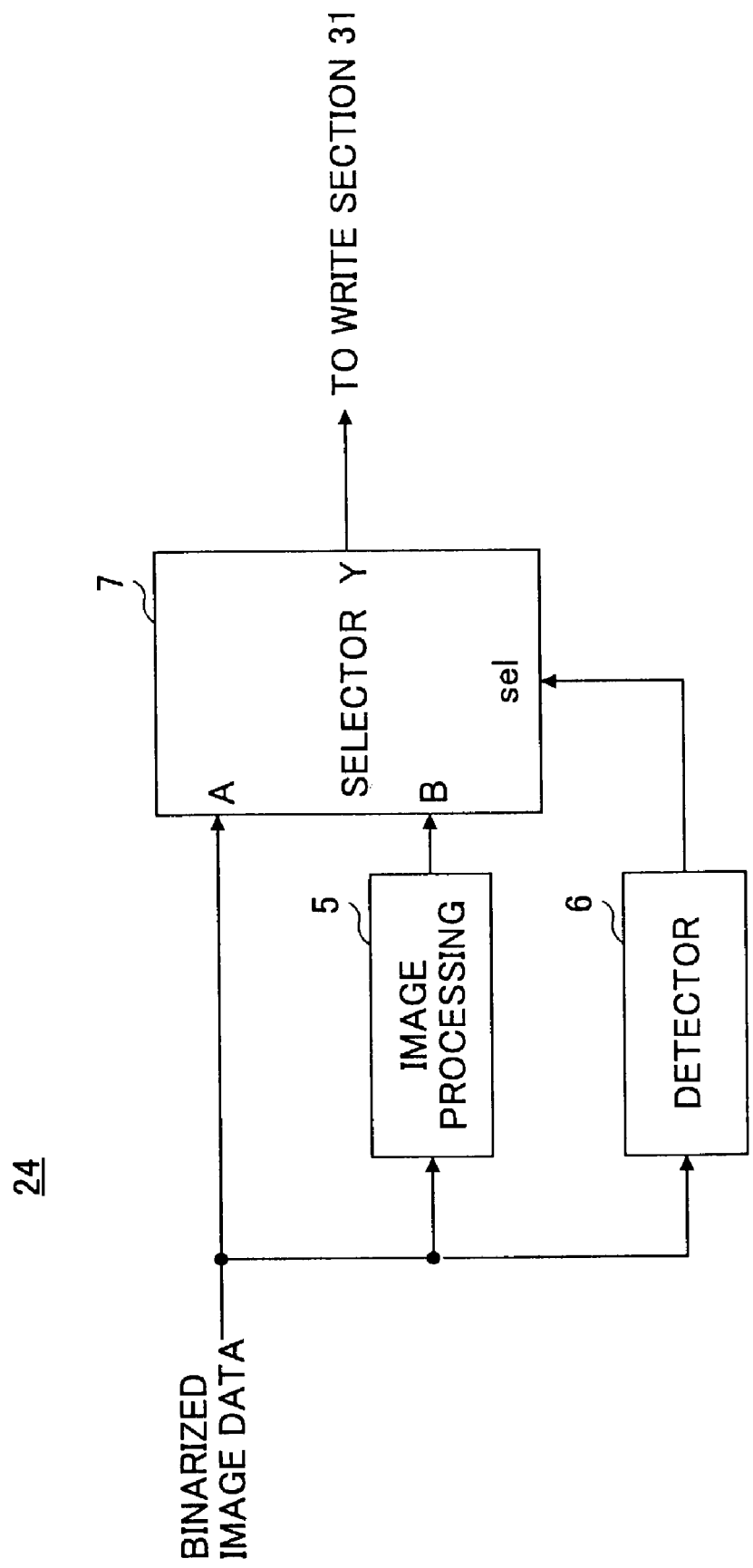
FIG. 3 is a system block diagram showing a structure of a modification of the first embodiment of the binarized image processing section.

As a modification of the first embodiment of the binarized image process unit 24, the image processor 4 for dot image portion may be omitted as shown in FIG. 3. FIG. 3 is a system block diagram showing a structure of this modification of the first embodiment of the binarized image process unit 24. In FIG. 3, those parts which are the same as those corresponding parts in FIG. 2 are designated by the same reference numerals, and a description thereof will be omitted. In this modification, the binarized image data supplied from the gradation process unit 23 is input directly to the input terminal A of the selector 7. Thus, the smoothing is not carried out with respect to the dot image portion of the binarized image data. For this reason, it is possible to positively prevent the picture quality deterioration caused by the deterioration of the gradation levels and the like.

Figure 4:
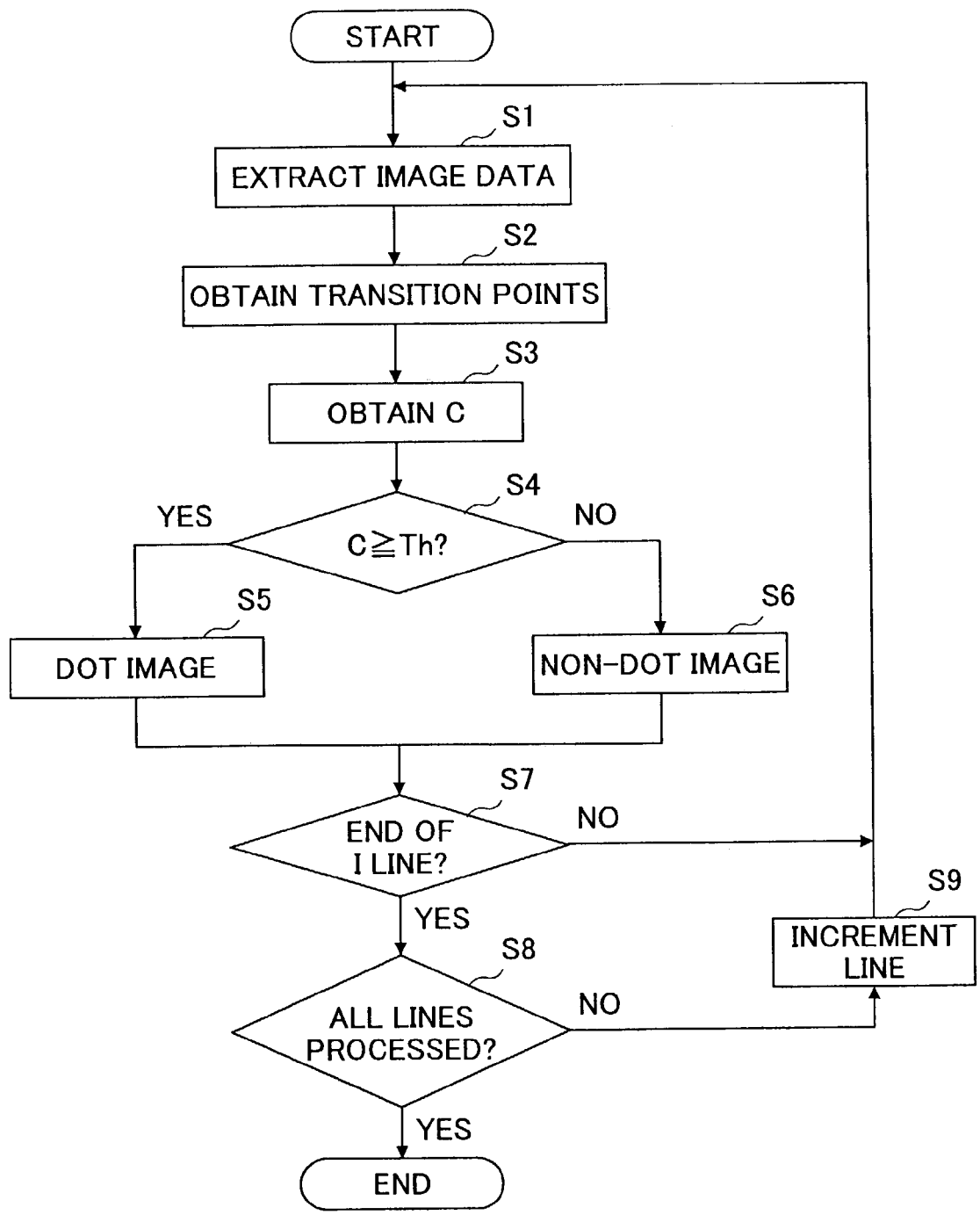
FIG. 4 is a flow chart for explaining a first embodiment of a method of detecting a dot image portion.
Figure 5:
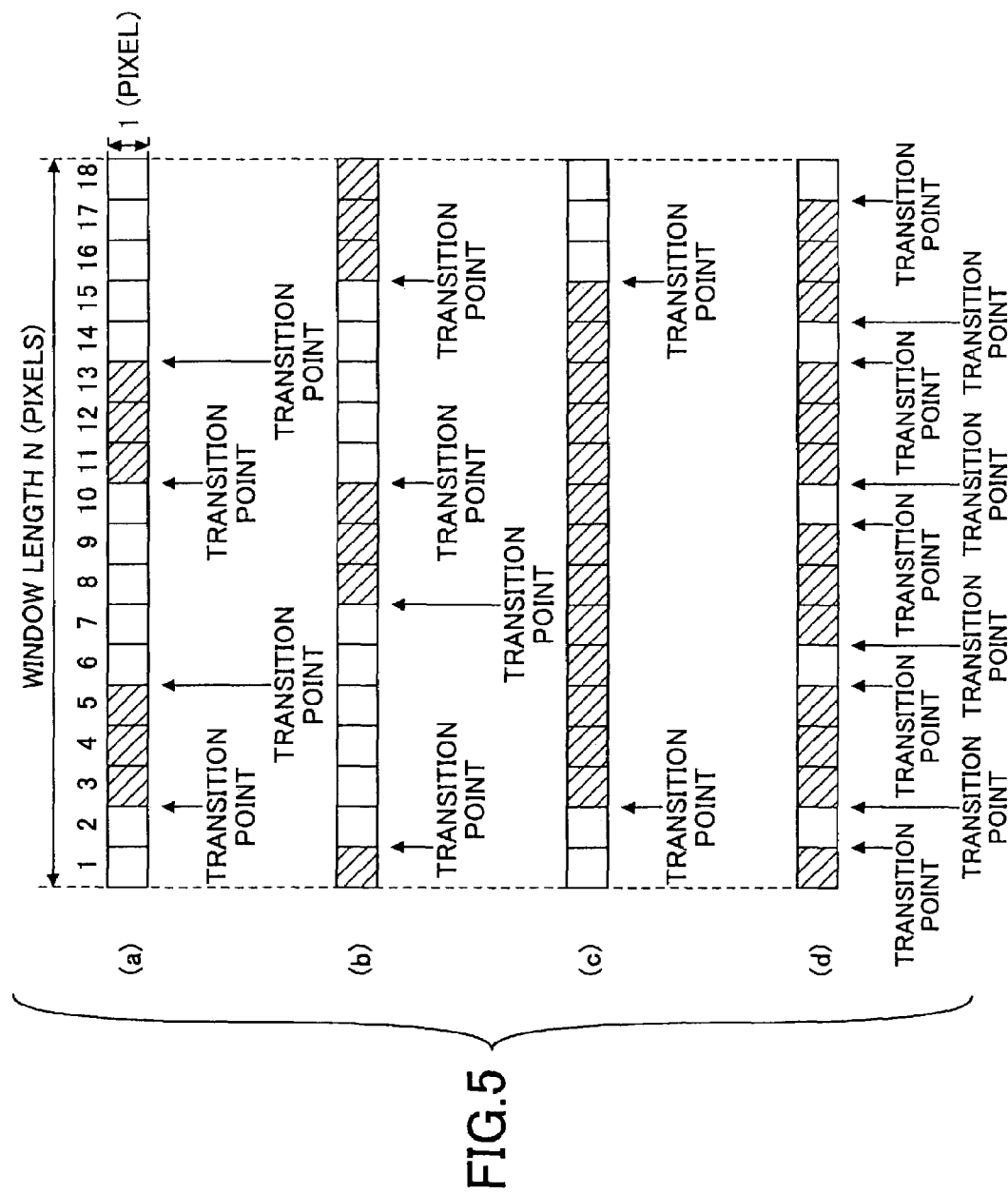
FIG. 5 is a diagram for explaining the first embodiment of the method of detecting the dot image portion.

Next, a description will be given of the operation of the dot image portion detector 6. FIG. 4 is a flow chart for explaining a first embodiment of a method of detecting the dot image portion employed by the dot image portion detector 6. FIG. 5 is a diagram for explaining this first embodiment of the method of detecting the dot image portion.

In FIG. 4, a step S1 extracts image data (pixel data) from the binarized image data which is supplied from the gradation process unit 23 shown in FIG. 1, using a window having a size of N×1 pixels, that is, N pixels existing in the main scan direction. The window length N is set in advance to a predetermined value which is less than or equal to a total number of pixels existing in 1 line which extends in the main scan direction of the binarized image data. A step S2 obtains transition points of the binary image data from a white pixel (first logic value) to a black pixel (second logic value) and from a black pixel to a white pixel. A step S3 obtains a total number C of the transition points from the white pixel to the black pixel and from the black pixel to the white pixel. A step S4 decides whether or not the total number C of the transition points is greater than or equal to a predetermined threshold value Th which is set in advance. If the decision result in the step S4 is YES, a step S5 judges that the image portion within the window is a dot image, and supplies to the selection terminal sel of the selector 7 shown in FIGS. 2 or 3 a selection signal which selectively outputs the input to the input terminal A of the selector 7 from the output terminal Y. On the other hand, if the decision result in the step S4 is NO, a step S6 judges that the image portion within the window is a non-dot image, and supplies to the selection terminal sel of the selector 7 shown in FIGS. 2 or 3 a selection signal which selectively outputs the input to the input terminal B of the selector 7 from the output terminal Y.

After the step S5 or S6, a step S7 decides whether or not 1 line of the binarized image data to be subjected to the image data extraction using the window ended. If the decision result in the step S7 is NO, the process returns to the step S1, so as to extract the image data extraction from the binarized image data using the window having the size of N×1 pixels, that is, N pixels existing in the main scan direction. If the decision result in the step S7 is YES, a step S8 decides whether or not all of the lines of the binarized image data are processed. If the decision result in the step S8 is NO, a step S9 increments the line (or line number) to be subjected to the process by 1, and the process returns to the step S1 to carry out the process with respect to the next 1 line. The process ends if the decision result in the step S8 is YES.

FIG. 5 shows a case where the window length N is 18 pixels and the threshold value Th is 4. In FIG. 5, a white rectangle indicates a white pixel, and a rectangle with hatching indicates a black pixel. In addition, numbers "1" through "18" illustrated in an upper portion of (a) in FIG. 5 indicate pixel numbers of the pixels within 1 window length N.

In FIG. 5, (a) shows a case where the total number C of the transition points is 4. In this case, the total number C of the transition points is greater than or equal to the threshold value Th, and thus, the dot image portion detector 6 judges that the image portion (image region) which is made up of N×1 pixels and extracted by the window is a dot image portion.

In FIG. 5, (b) shows a case where the total number C of the transition points is 4. In this case, the total number C of the transition points is also greater than or equal to the threshold value Th, and thus, the dot image portion detector 6 judges that the image portion (image region) which is made up of N×1 pixels and extracted by the window is a dot image portion.

In FIG. 5, (c) shows a case where the total number C of the transition points is 2. In this case, the total number C of the transition points is less than the threshold value Th, and thus, the dot image portion detector 6 judges that the image portion (image region) which is made up of N×1 pixels and extracted by the window is a non-dot image portion.

In FIG. 5, (d) shows a case where the total number C of the transition points is 9. In this case, the total number C of the transition points is greater than or equal to the threshold value Th, and thus, the dot image portion detector 6 judges that the image portion (image region) which is made up of N×1 pixels and extracted by the window is a dot image portion.

In the process shown in FIG. 4, the step S2 obtains the transition points from the white pixel to the black pixel and from the black pixel to the white pixel, and the step S3 obtains the total number C of the transition points from the white pixel to the black pixel and from the black pixel to the white pixel. However, these steps S2 and S3 may be omitted in a case where the total number C of the transition points from the white pixel to the black pixel and from the black pixel to the white pixel is known in advance. In this case, the step S4 may be carried out after the step S1, so as to decide whether or not the total number C of the transition points is greater than or equal to the predetermined threshold value Th. The total number C of the transition points from the white pixel to the black pixel and from the black pixel to the white pixel is known in advance, in cases such as when the binarized image data is directly supplied from the system controller 22, for example.

Figure 6:
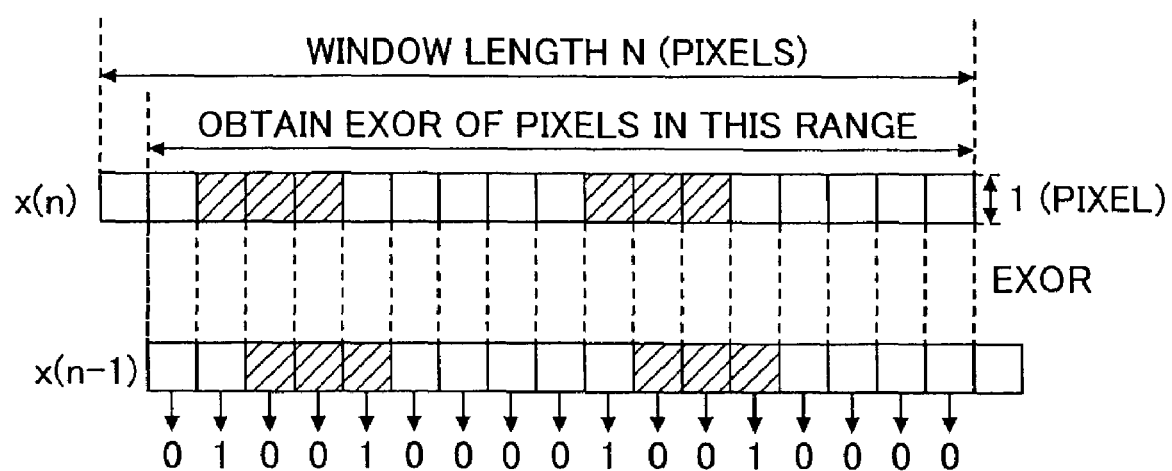
FIG. 6 is a diagram for explaining a method of obtaining transition points of a binarized image data from a white pixel to a black pixel and from a black pixel to a white pixel within a window.

FIG. 6 is a diagram for explaining a method of obtaining the transition points from the white pixel to the black pixel and from the black pixel to the white pixel of the binarized image data within the window in the step S2 shown in FIG. 4. In FIG. 6, a white rectangle indicates a white pixel, and a rectangle with hatching indicates a black pixel.

As shown in FIG. 6, an exclusive-OR operation (EXOR) is made between a binarized image data x(n) which is obtained by extracting the binarized image data supplied from the gradation process unit 23 shown in FIG. 1 using the window having the size of N×1 pixels, that is, N pixels existing in the main scan direction, and a binarized image data x(n−1) which is obtained by shifting the binarized image data x(n) by 1 pixel (that is, delayed or advanced by 1 pixel) in the main scan direction. The pixel at which the result of the exclusive-OR operation becomes "1" corresponds to the transition point from the white pixel to the black pixel or the transition point from the black pixel to the white pixel.

Accordingly, in this case, when obtaining the total number C of the transition points from the white pixel to the black pixel and from the black pixel to the white pixel in the step S3 shown in FIG. 4, the number of pixels at which the result of the exclusive-OR operation becomes "1" is counted. Such a counting process may be described by the following formula (1).

$$C = \sum_{2}^{N} EXOR\{x(n), x(n-1)\} \quad (1)$$

Figure 7:
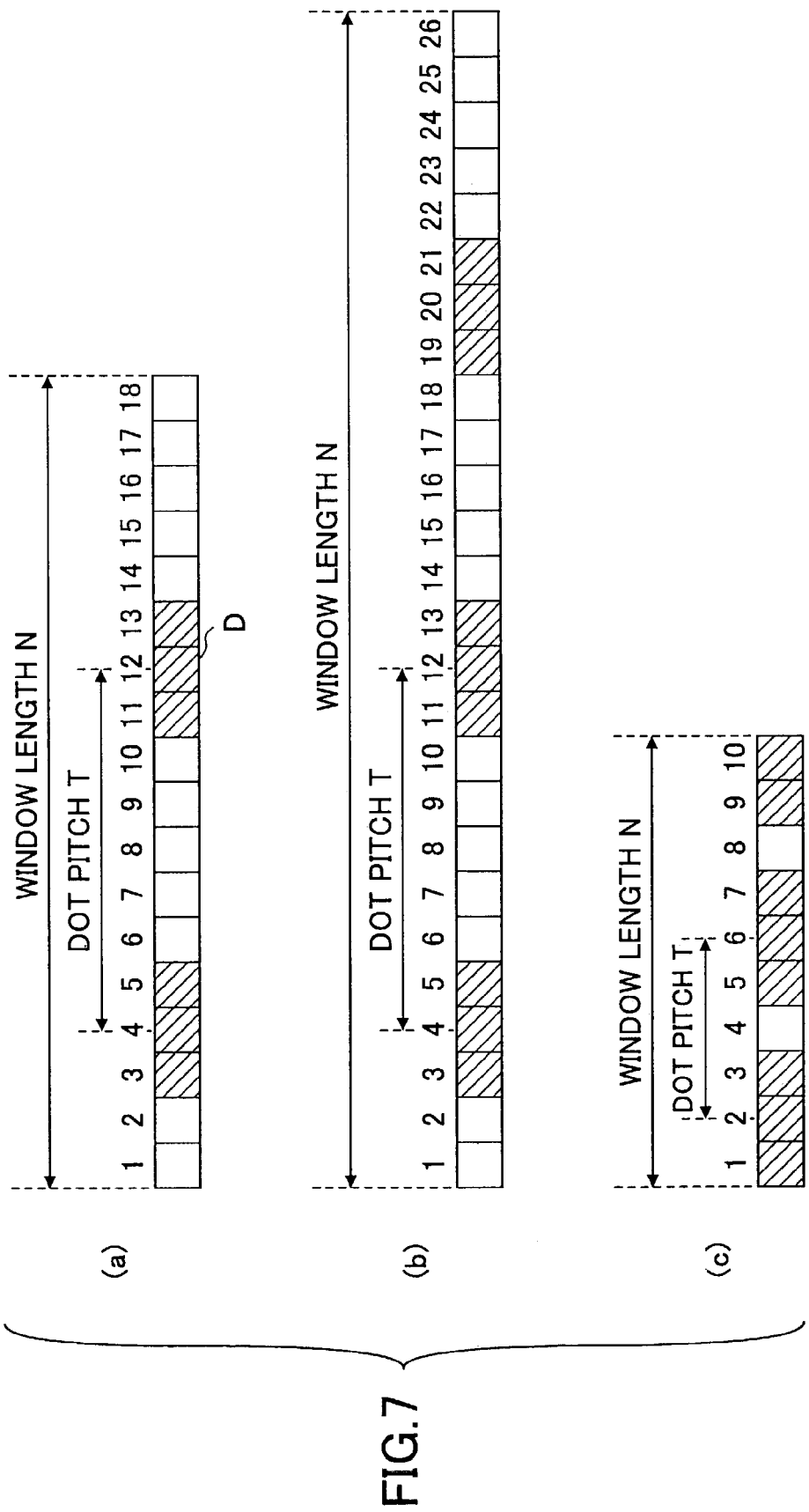
FIG. 7 is a diagram for explaining a method of setting a window length N and a threshold value Th.

Next, a description will be given of a method of setting the window length N and the threshold value Th, by referring to FIG. 7. FIG. 7 is a diagram for explaining the method of setting the window length N and the threshold value Th. In FIG. 7, a white rectangle indicates a white pixel, and a rectangle with hatching indicates a black pixel. In the binarized image data shown in FIG. 7, a succession of black pixels is defined as a dot D, and a distance between centers of 2 adjacent dots D is defined as a dot pitch T. In addition, numbers "1" through "18" illustrated in an upper portion of (a) in FIG. 7 indicate pixel numbers of the pixels within 1 window length N, numbers "1" through "26" illustrated in an upper portion of (b) in FIG. 7 indicate pixel numbers of the pixels within 1 window length N, and numbers "1" through "10" illustrated in an upper portion of (c) in FIG. 7 indicate pixel numbers of the pixels within 1 window length N.

It is assumed (or estimated) that the dot image portion has the dot pitch T, and the window length N and the threshold value Th are determined by the following formulas (2) and (3) based on the assumed dot pitch T. The dot pitch T becomes a maximum dot pitch of the dot image portion in the case shown in FIG. 5. In the formulas (2) and (3), n denotes an integer.

$$N=(T \times n)+2 \quad (2)$$

$$Th=2 \times n \quad (3)$$

In the formula (2), T×n indicates a length which is n times the dot pitch T, and it is indicated that by adding a length amounting to 2 pixels (+2) to this length, n dots D having the dot pitch T are completely included within the window length N. In addition, the formula (3) indicates the total number of the transition points from the white pixel to the black pixel and from the black pixel to the white pixel for the n dots D completely included within the window length N in the dot image portion, and it is indicated that 2×n or more transition points exist in the dot image portion in the case of the embodiment shown in FIG. 5 and that 2×n transition points exist in the dot image portion in the case of the modification thereof.

In a case (a) shown in FIG. 7, the assumed (or estimated) dot pitch T is T=8, and n=2 dots D are completely included within the window length N. Accordingly, the window length N and the threshold value Th for this case can be obtained as follows based on the formulas (2) and (3) described above.

$$N=(8 \times 2)+2=18$$

$$Th=2 \times 2=4$$

In a case (b) shown in FIG. 7, the assumed (or estimated) dot pitch T is T=8, and n=3 dots D are completely included within the window length N. Accordingly, the window length N and the threshold value Th for this case can be obtained as follows based on the formulas (2) and (3) described above.

$$N=(8 \times 3)+2=26$$

$$Th=2 \times 3=6$$

In a case (c) shown in FIG. 7, the assumed (or estimated) dot pitch T is T=4, and n=2 dots D are completely included within the window length N. Accordingly, the window length N and the threshold value Th for this case can be obtained as follows based on the formulas (2) and (3) described above.

$$N=(4 \times 3)+2=10$$

$$Th=2 \times 2=4$$

In the description given above, the binarized image data obtained from the system controller 22 is supplied directly to the binarized image process unit 24 within the image processing section 2. However, when a multi-valued digital image data is generated by a computer such as the system controller 22, the multi-valued digital image data may of course be supplied to the shading correction process unit 16 within the read section 1 or, the filtering process unit 21, the γ-correction process unit 22 or the gradation process unit 23 within the image processing section 2.

Figure 8:
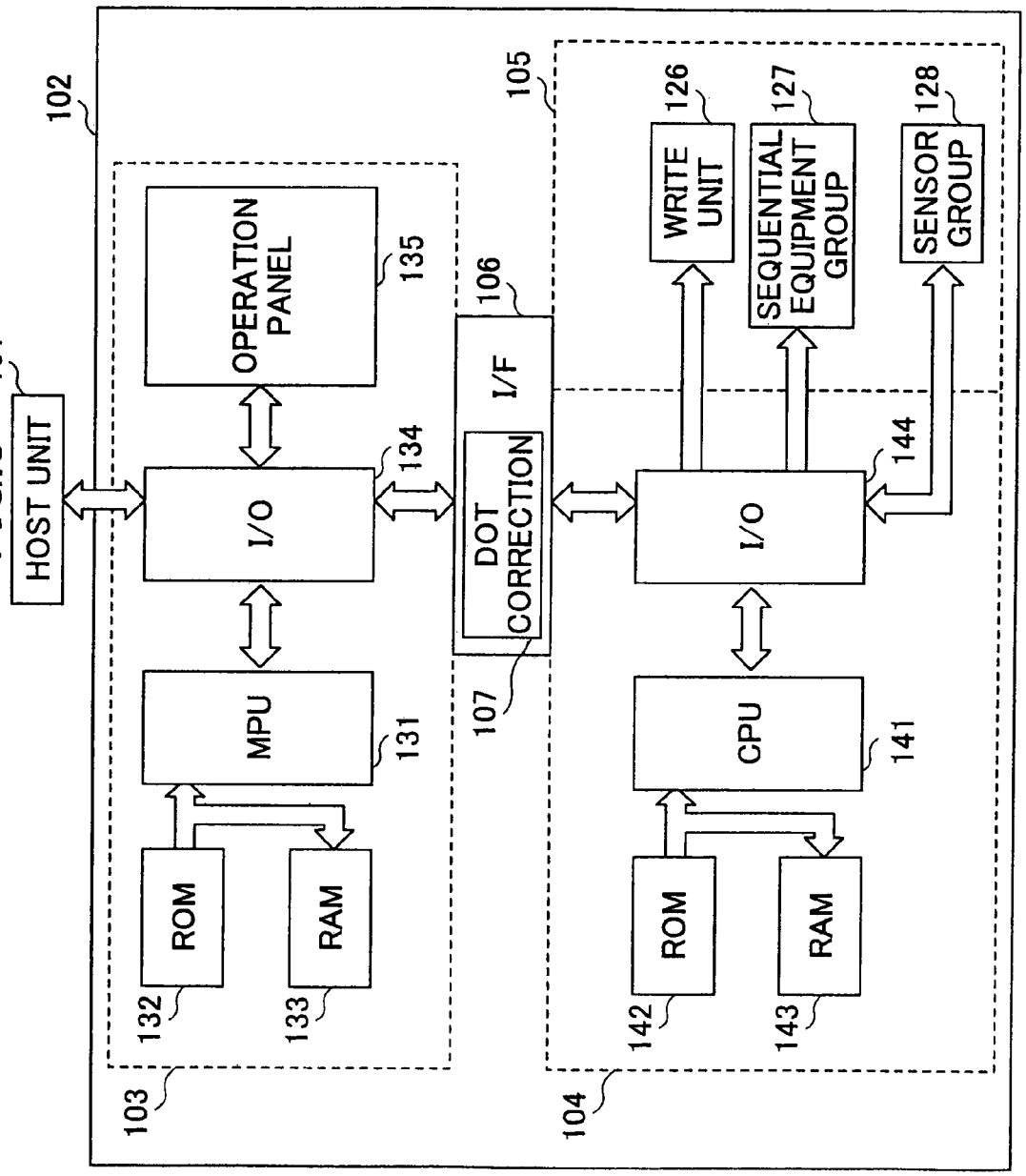
FIG. 8 is a system block diagram showing a structure of a second embodiment of the image forming apparatus according to the present invention.

FIG. 8 is a system block diagram showing a structure of a second embodiment of the image forming apparatus according to the present invention. This second embodiment of the image forming apparatus employs a second embodiment of the image processing apparatus according to the present invention. In this embodiment, the present invention is applied to a laser printer, however, the present invention is of course similarly applicable to a copying machine, a facsimile machine or the like.

A laser printer 102 shown in FIG. 8 is connected to a host unit 101 which is formed by a personal computer or the like. The laser printer 102 includes a controller 103, an engine driver 104, a printer engine 105, and an internal interface (I/F) 106. The internal interface 106 or, a combination of the controller 103 and the internal interface 106, corresponds to the second embodiment of the image processing apparatus.

The controller 103 includes an MPU 131, a ROM 132, a RAM 133, an input/output (I/O) unit 134, and an operation panel 135 which are connected as shown in FIG. 8. The engine driver 104 includes a CPU 141, a ROM 142, a RAM 143, and an input/output (I/O) unit 144. The printer engine 105 includes a write unit 126, a sequential equipment group 127 which is formed by various sequential equipments, and a sensor group 128 which is formed by various sensors or switches. The internal interface 106 includes a dot correction unit 107. The basic structure itself of the laser printer 102, excluding the dot correction unit 107 within the internal interface 106, is known, but it is of course possible to employ other basic structures for the laser printer 102.

The host unit 101 corresponds to the system controller 22 shown in FIG. 1, and the operation panel 146 of the controller 103 corresponds to the operation panel 21 shown in FIG. 1. The parts of the controller 103, excluding the operation panel 135, corresponds to the parts of the image process section 2 shown in FIG. 1 excluding the binarized image process unit 24. The dot correction unit 107 corresponds to the binarized image process unit 24 shown in FIG. 1. In addition, the engine driver 104 and the printer engine 105 correspond to the image forming section 3 shown in FIG. 1.

When the controller 103 receives a print data from the host unit 101, the controller 103 develops the print data into bit map data in units of pages, and converts the bit map data into dot information for driving a laser diode (light source) within the write unit 126, that is, into a binarized image data. The binarized image data is processed into a multi-valued digital image data via the internal interface 106 and supplied to the engine driver 104. The engine driver 104 sequentially controls the printer engine 105 based on the multi-valued digital image data, and forms (prints) an image on a recording medium such as paper.

The dot correction unit 107 within the internal interface 106 carries out an image processing which will be described later, such as smoothing, with respect to the binarized image data supplied from the controller 103, and outputs the multi-valued digital image data so as to improve the picture quality of the image which is formed on the recording medium by the printer engine 105.

In the controller 103, the MPU 131 functions as a main controller for controlling the entire laser printer 102, and controls the operation of various parts within the laser printer 102. The ROM 132 stores computer programs, constant data, character font data and the like which are required by the MPU 131. The RAM 133 temporarily stores general data, dot patterns, intermediate data obtained during operations executed by the MPU 131 and the like. The input/output unit 134 controls the input of data to and output of data from the laser printer 102. The operation panel 135 is connected to the MPU 131 via the input/output unit 134. These constituent elements of the controller 103 are mutually connected via a data bus, an address bus, a control bus and the like, as shown in FIG. 8. The internal interface 106 which includes the dot correction unit 107 is also connected to the MPU 131 via the input/output unit 134.

In the engine driver 104, the CPU 141 functions as a sub controller for controlling the laser printer 102, and controls particularly the operation of various parts within the engine driver 104 and the printer engine 105. The ROM 142 stores computer programs, constant data and the like which are required by the CPU 141. The RAM 143 temporarily stores general data, intermediate data obtained during operations executed by the CPU 141 and the like. The input/output unit 144 controls the input of data to and output of data from the engine driver 104. The input/output unit 144 is connected to the internal interface 106, and inputs the multi-valued digital image data from the controller 103 and the states of various switches on the operation panel 135, and outputs an image clock WCLK and status signals indicating paper end and the like. These constituent elements of the engine driver 104 are mutually connected via a data bus, an address bus, a control bus and the like, as shown in FIG. 8. The input/output unit 144 is connected to the write unit 126, the sequential equipment group 127 and the sensor group 128 within the printer engine 105. The sequential equipment group 127 includes units such as the charger and the developing unit. In addition, the sensor group 128 includes sensors such as a synchronization sensor.

The controller 103 receives commands such as a print command (or instruction) and the print data such as character data and image data, from the host unit 101, and edits the print data. Hence, character codes are converted into dot patterns which are necessary for writing the image, using the character font data stored in the ROM 132, and the bit map data of the characters and images (hereinafter generally referred to as images) are developed in units of pages in an image RAM region within the RAM 133.

When a ready signal and the image clock WCLK are received from the engine driver 104, the controller 103 generates the binarized image data which is synchronized to the image clock WCLK based on the bit map data (dot pattern) developed in the image RAM region within the RAM 133. This binarized image data is supplied to the engine driver 104 via the internal interface 106. As will be described later, the binarized image data is processed into the multi-valued digital image data by being subjected to the image processing including the smoothing in the dot correction unit 107 within the internal interface 106.

Switches and a display part (both not shown) are provided on the operation panel 135, and operations such as controlling the data, transferring the data to the engine driver 104, and displaying a state of the laser printer 102 on the display part are carried out when an operator operates the operation panel 135 and inputs instructions.

The engine driver 104 controls the write unit 126, the sequential equipments 127 and the like within the printer engine 105, based on the multi-valued digital image data which is obtained from the controller 103 after subjecting the binarized image data to the image processing such as the smoothing within the dot correction unit 107 within the internal interface 106. In addition, the engine driver 104 inputs the multi-valued digital image data required to write the image via the internal interface 106, and outputs the multi-valued digital image data to the write unit 126 within the printer engine 105. Furthermore, the engine driver 104 inputs and processes signals which are output from the sensor group 128 within the printer engine 105 and indicate the state of various parts within the printer engine 105, and outputs necessary status signals indicating error, paper end and the like to the controller 103 via the internal interface 106.

Figure 9:
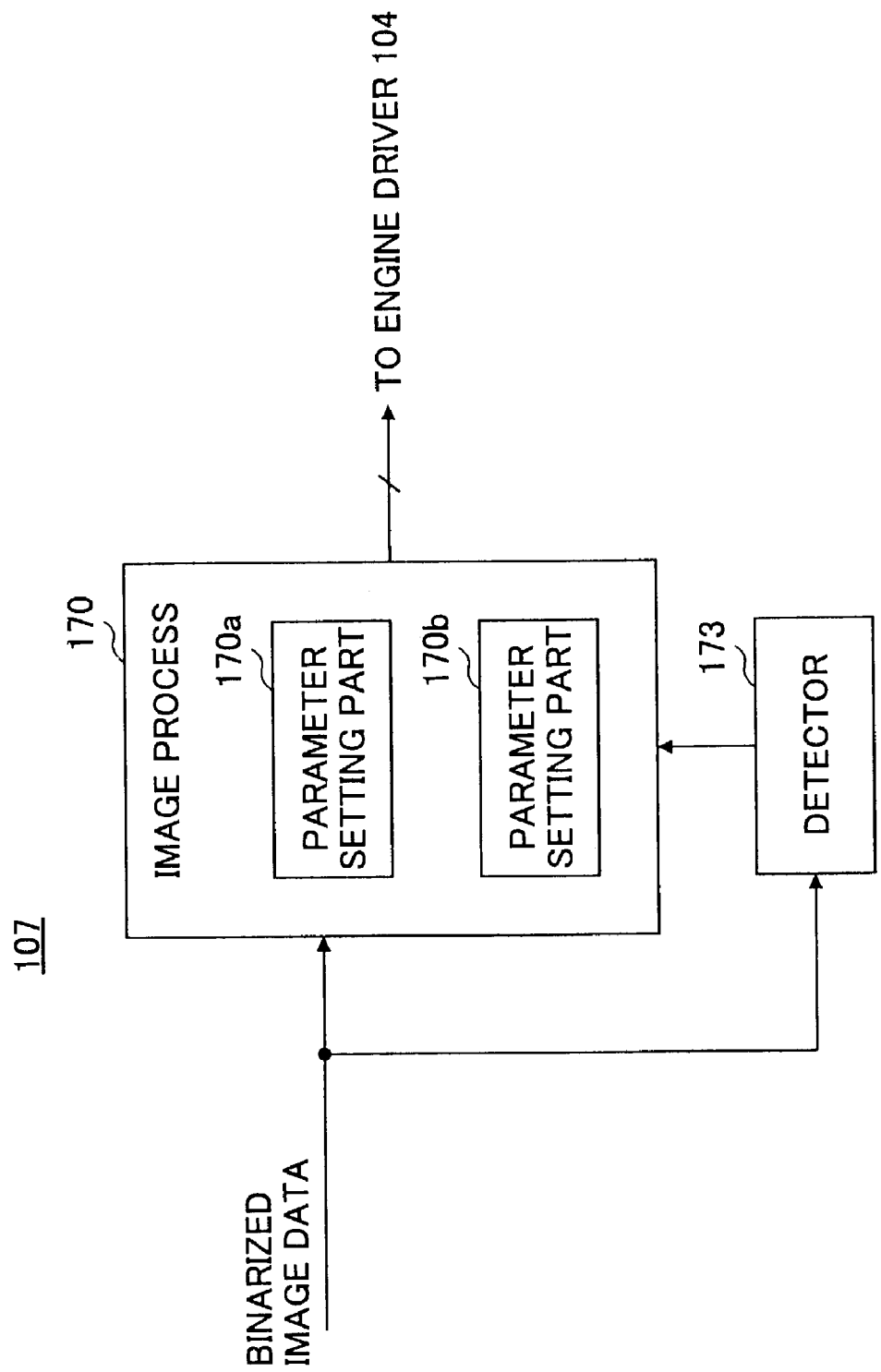
FIG. 9 is a system block diagram showing a first embodiment of a dot correcting section.

FIG. 9 is a system block diagram showing a first embodiment of the dot correction unit 107. The dot correction unit 107 shown in FIG. 9 includes an image process unit 170 and a dot image portion detector 173 Parameter setting parts 170a and 170b are provided within the image process unit 170. The parameter setting parts 170a and 170b are respectively formed by a register or the like, and smoothing parameters (jaggy correction parameters) from the MPU 131 are set in the parameter setting parts 170a and 170b. The smoothing parameter for the dot image portion, (hereinafter simply referred to as a dot image smoothing parameter) is set in the parameter setting part 170a, and the smoothing parameter for the non-dot image portion (hereinafter simply referred to as a non-dot image smoothing parameter) is set in the parameter setting part 170b. The smoothing parameters determine the extent, intensity or the like of the smoothing. The smoothing parameters which are set in the parameter setting parts 170a and 170b may be set in advance, set from the host unit 101 via the MPU 131 or, set from the MPU 131 depending on an operation made on the operation panel 135 by the operator.

The dot image portion detector 173 detects the dot image portion of the binarized image data by a method similar to that employed by the dot image portion detector 6 shown in FIG. 2, so as to identify (distinguish) the dot image portion and the non-dot image portion. When the selection signal output from the dot image portion detector 173 indicates detection of the dot image portion, the image process unit 170 carries out the smoothing with respect to the binarized image data using the dot image smoothing parameter set in the parameter setting part 170a, and outputs the multi-valued digital image data. On the other hand, when the selection signal output from the dot image portion detector 173 indicates detection of the non-dot image portion, the image process unit 170 carries out the smoothing with respect to the binarized image data using the non-dot image smoothing parameter set in the parameter setting part 170b, and outputs the multi-valued digital image data. In the smoothing using the dot image smoothing parameter, the smoothing is not carried out with respect to the line segments, for example, and the smoothing is only carried out to an extent which slightly adjusts the width of the line segments, so as not to change the shape of the dots. On the other hand, in the smoothing using the non-dot image smoothing parameter, the smoothing is carried out in a normal manner using the method proposed in the Japanese Laid-Open Patent Application No. 5-207282, for example. As a result, it is possible to simultaneously realize reduced jaggedness in the non-dot image portion and satisfactory (non-deteriorated) gradation in the dot image portion.

Figure 10:
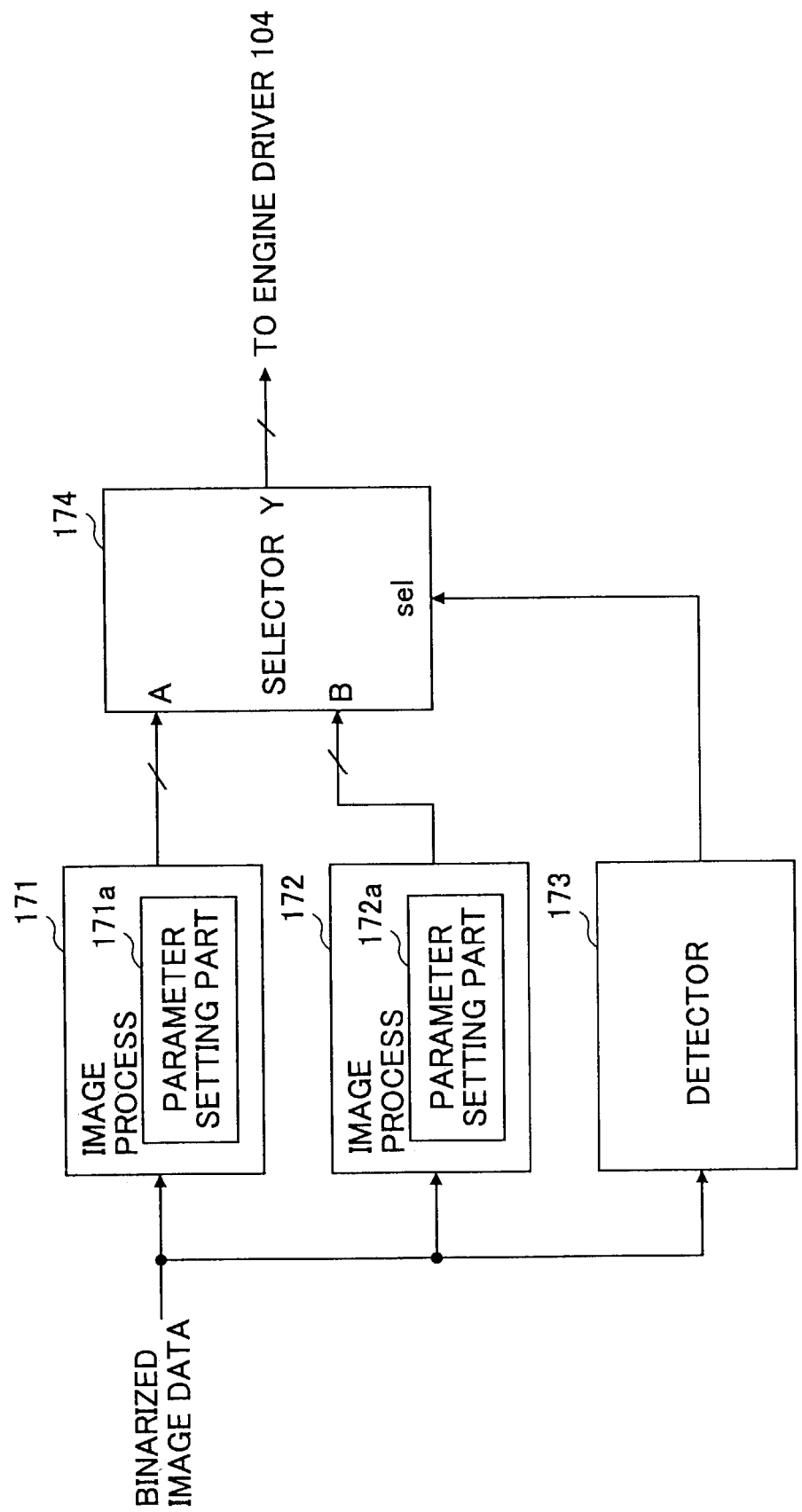
FIG. 10 is a system block diagram showing a second embodiment of the dot correcting section.

FIG. 10 is a system block diagram showing a second embodiment of the dot correction unit 107. In FIG. 10, those parts which are the same as those corresponding parts in FIG. 9 are designated by the same reference numerals, and a description thereof will be omitted. The dot correction unit 107 shown in FIG. 10 includes an image process unit 171 for the dot image portion, an image process unit 172 for the non-dot image portion, the dot image portion detector 173, and a selector 174. A parameter setting part 171a, which is formed by a register or the like to which the dot image smoothing parameter from the MPU 131 is set, is provided within the image process unit 171. A parameter setting part 172a, which is formed by a register or the like to which the non-dot image smoothing parameter from the MPU 131 is set, is provided within the image process unit 172. The smoothing parameters set in the parameter setting parts 171a and 172a may be set in advance, set from the host unit 101 via the MPU 131 or, set from the MPU 131 depending on an operation made on the operation panel 135 by the operator.

Multi-valued digital image data output from the image process units 171 and 172 are input to corresponding input terminals A and B of the selector 174. The dot image portion detector 173 detects the dot image portion within the binarized image data. When the dot image portion detector 173 detects the dot image portion, the dot image portion detector 173 supplies to a selection terminal sel of the selector 174 a selection signal which selectively outputs the multi-valued digital image data input to the input terminal A from an output terminal Y of the selector 174. On the other hand, when the dot image portion detector 173 does not detect the dot image portion, the dot image portion detector 173 supplies to the selection terminal sel of the selector 174 a selection signal which selectively outputs the multi-valued digital image data input to the input terminal B from the output terminal Y of the selector 174. The multi-valued digital image data output from the output terminal Y of the selector 174 is supplied to the input/output unit 144 within the engine driver 104 shown in FIG. 8.

In this embodiment, the same binarized image data is subjected to the smoothing for the dot image data and the resulting multi-valued digital image data is input to the input terminal A of the selector 174 on one hand, and subjected to the smoothing for the non-dot image data and the resulting multi-valued digital image data is input to the input terminal B of the selector 174 on the other. In addition, the multi-valued digital image data input to one of the input terminals A and B of the selector 174 is selectively output from the output terminal Y of the selector 174 based on the detection result of the dot image portion detector 173. For this reason, it is possible to use for the image process units 171 and 172 an image process unit which is inexpensive and has a slower processing speed compared to the image process unit 170 shown in FIG. 9.

Figure 11:
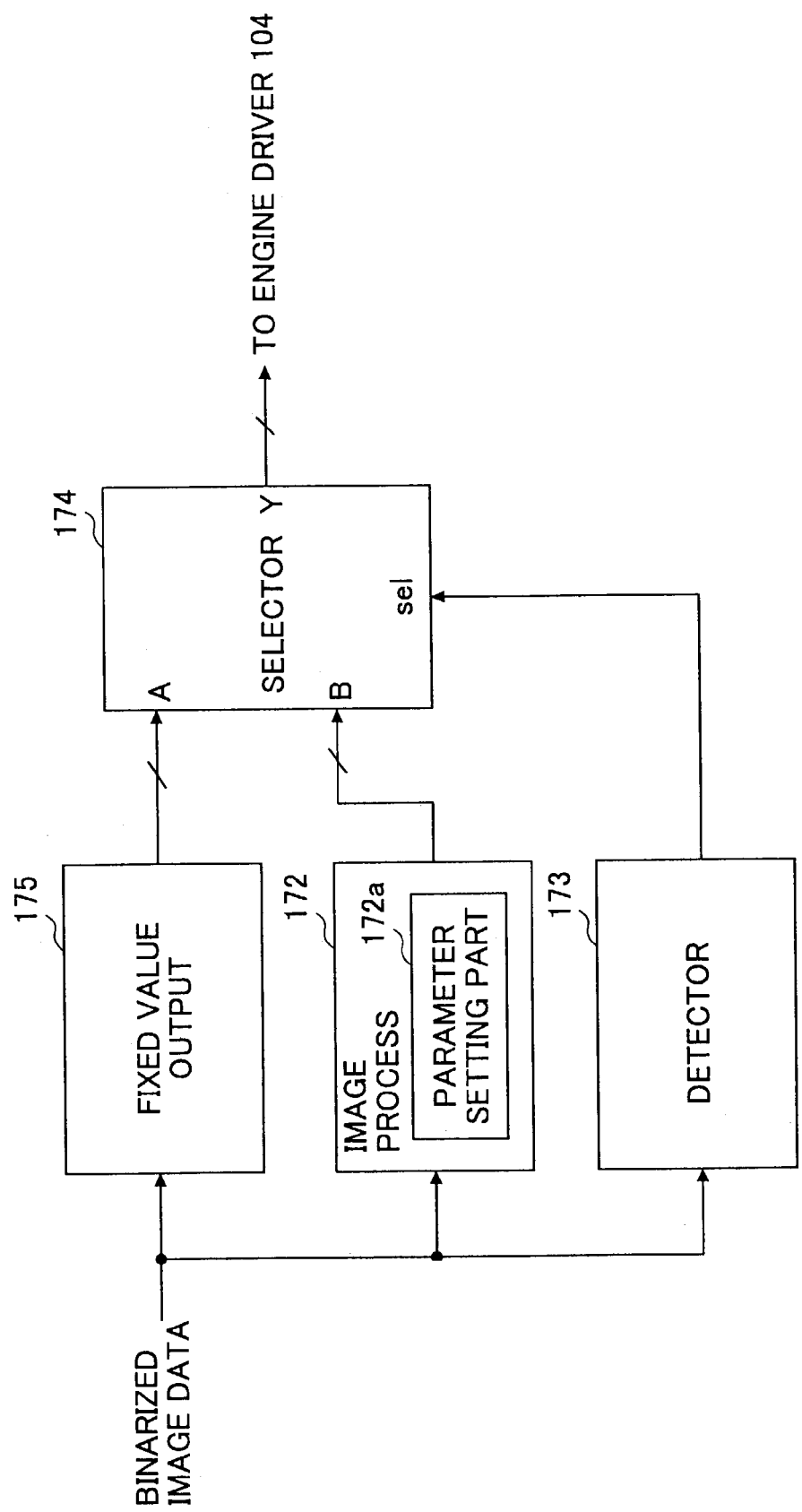
FIG. 11 is a system block diagram showing a third embodiment of the dot correcting section.

FIG. 11 is a system block diagram showing a third embodiment of the dot correction unit 107. In FIG. 11, those parts which are the same as those corresponding parts in FIG. 10 are designated by the same reference numerals, and a description thereof will be omitted. The dot correction unit 107 shown in FIG. 11 includes a fixed value output unit 175, the image process unit 172 for non-dot image portion, the dot image portion detector 173, and the selector 174. The fixed value output unit 175 converts the binarized image data into the multi-valued digital image data without carrying out the smoothing, and inputs the converted multi-valued digital image data to the input terminal A of the selector 174.

In this embodiment, the hardware scale of the fixed value output unit 175 is small compared to that of the image process unit 172 for the non-dot image which carries out the smoothing. For this reason, the hardware scale and cost of the dot correction unit 107 shown in FIG. 11 can be reduced compared to the dot correction unit 107 shown in FIG. 10 which uses the two image process units 171 and 172.

The multi-valued digital image data which is output from any of the first through third embodiments of the dot correction unit 107 is supplied to the write unit 126 within the printer engine 105 via the input/output unit 144. In the write unit 126, a laser driver which drives the laser diode is driven based on the multi-valued digital image data, and the writing is carried out in multi-values using a pulse width modulation (PWM), a power modulation or the like. As a result, it is possible to obtain a smooth image in the non-dot image portion of the image due to the smoothing, and it is possible to obtain a satisfactory gradation in the dot image portion of the image by not carrying out a correction which would otherwise deteriorate the picture quality of the dot image portion.

Next, a description will be given of a third embodiment of the image forming apparatus according to the present invention. This third embodiment of the image forming apparatus employs a third embodiment of the image processing apparatus according to the present invention. The basic structure of this third embodiment of the image forming apparatus is the same as that of the second embodiment of the image forming apparatus shown in FIG. 8, and an illustration and description thereof will be omitted. In this embodiment, the present invention is applied to a laser printer, but it is of course possible to similarly apply the present invention to a copying machine, a facsimile machine or the like.

In this embodiment, the resolution of the image obtained in the write unit 126 is made variable, and the dot image portion detector 173 can accurately detect the dot image portion even when the resolution is varied.

Figure 12:
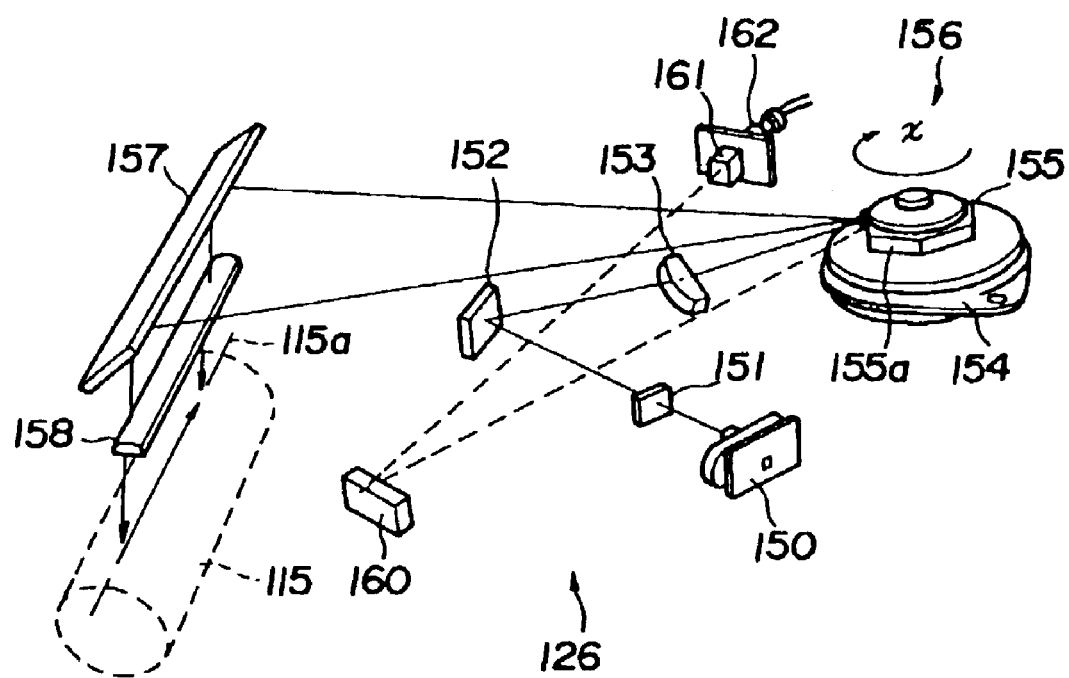
FIG. 12 is a diagram showing a structure of a write unit for a case where a resolution is variable.

FIG. 12 is a diagram showing a structure of the write unit 126 for a case where the resolution is variable. As shown in FIG. 12, the write unit 126 includes a laser diode unit 150, a cylindrical lens 151, a mirror 152, an imaging lens 153, a disk-shaped motor 154, a rotary deflector 156 having a polygonal mirror 155 with mirror surfaces 155a, a mirror 157, a cylindrical lens 158, a mirror 160, a condenser lens 161 having a cylindrical lens or the like, and a synchronization sensor 162 made of a light receiving element. A photoconductive body (or drum) 115 is also shown in FIG. 12. In FIG. 12, 115a denotes a main scan line, and x denotes a rotating direction of the polygonal mirror 155.

The laser diode unit 150 integrally includes a laser diode as a light source, and a collimator lens which converts a divergent light beam emitted from the laser diode into a parallel light beam. The cylindrical lens 151 has a function of shaping the parallel light beam emitted from the laser diode unit 150 in a sub scan direction on the photoconductive body 115. The imaging lens 153 converts the parallel beam reflected by the mirror 152 into a convergent light beam, and irradiates the convergent light beam on the mirror surface 155a of the polygonal mirror 155.

Of the plurality of mirror surfaces 151a of the polygonal mirror 155, a predetermined number of mirror surfaces are curved. Hence, the polygonal mirror 155 forms a post object type (a type of deflector arranged at a position after the light beam is converted into the convergent light beam) rotary deflector 156 which does not use an fθ lens which is conventionally arranged between the polygonal mirror 155 and the mirror 157.

The mirror 157 reflects the light beam which is deflected by the rotary deflector 156 towards the photoconductive body 115 as a scanning light beam. Thus, the scanning light beam is imaged as a sharp beam spot which scans along the main scan line 115a on the photoconductive body 115 via the cylindrical lens 158.

The mirror 160 is arranged to receive a light beam which is outside a scan region on the photoconductive body 115, of the light beam which is deflected by the rotary deflector 156. The light beam reaching the mirror 160 is reflected towards the synchronization sensor 162. The light beam which is reflected by the mirror 160 and is converged by the condenser lens 161 is converted into a synchronizing signal by the light emitting element such as a photodiode forming the synchronization sensor 162. This synchronizing signal is used to maintain constant a scan start position on the photoconductive body 115.

Therefore, the write unit 126 shown in FIG. 12 is formed by a scanning optical system using the polygonal mirror 155, and the write resolution is variably set in response to an instruction from the engine driver 104 shown in FIG. 8. More particularly, the controller 103 develops the bit map data in units of pages with a different resolution depending on the resolution information instructed from the host unit 101. The resolution information instructed to the controller 103 is supplied to the engine driver 104 via the internal interface 106. The engine driver 104 controls a rotational speed of the disk-shaped motor 154 within the write unit 126 depending on the received resolution information, so as to vary the rotational speed of the polygonal mirror 155 and to realize the writing at a desired resolution. As a result, the resolution with which the image is formed can be variably set.

Figure 13:
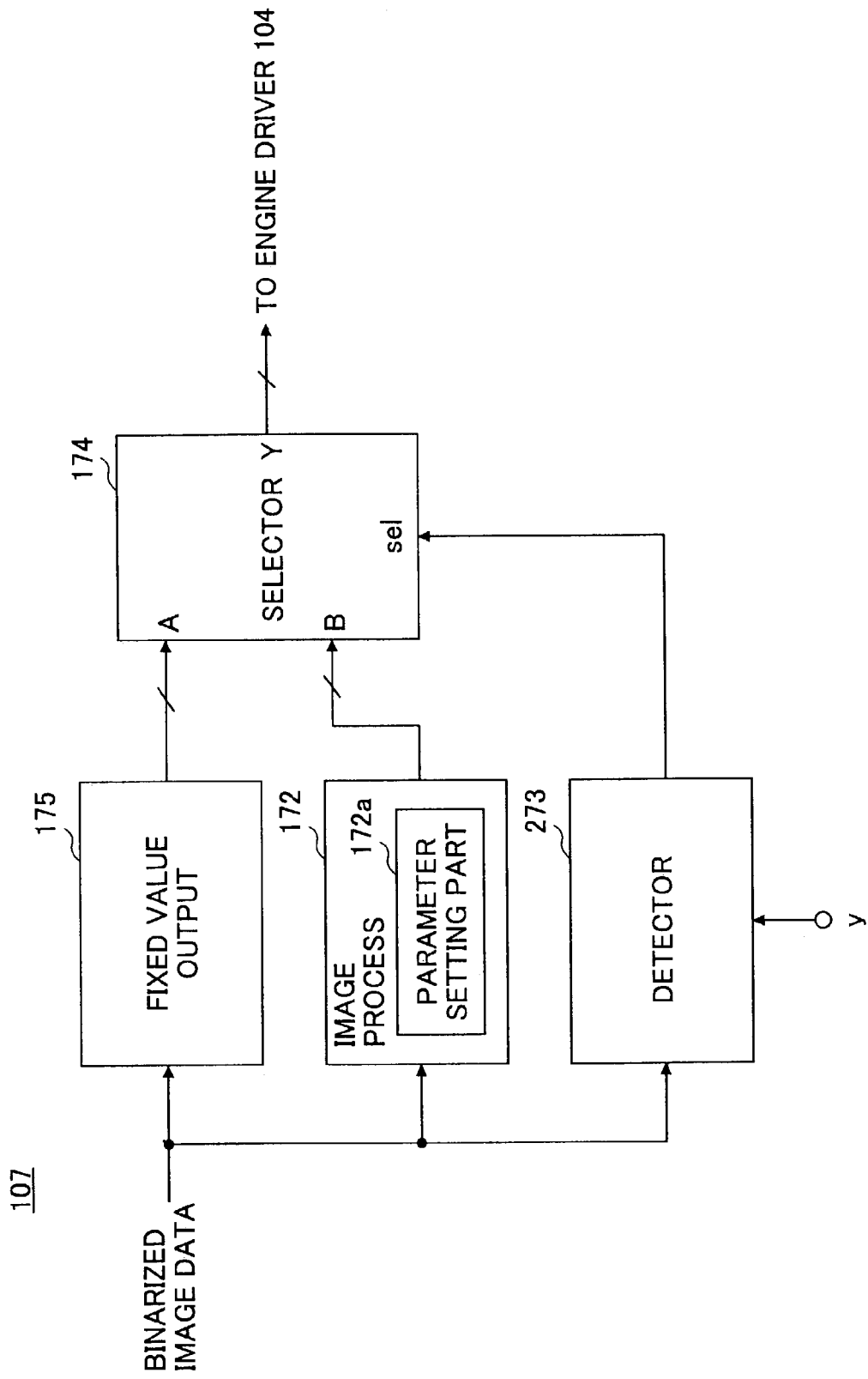
FIG. 13 is a system block diagram showing a structure of an important part of a third embodiment of the image forming apparatus according to the present invention.

FIG. 13 is a system block diagram showing a structure of an important part of a third embodiment of the image forming apparatus according to the present invention. More particularly, FIG. 13 shows the structure of an embodiment of the dot correction unit 107 shown in FIG. 8. In FIG. 13, those parts which are the same as those corresponding parts in FIG. 11 are designated by the same reference numerals, and a description thereof will be omitted.

Dot pitch (or interval) information (dot pitch y) which is obtained by converting the resolution information (resolution r) is obtained from the controller 103 and supplied to a dot image portion detector 273 shown in FIG. 13 via the engine driver 104. The dot image portion detector 273 changes the window length N and the threshold value Th depending on the dot pitch information. The detection itself of the dot image portion using the changed window length N and threshold value Th is similar to the detecting operation of the dot image portion detector 173 shown in FIG. 11. As a result, it is possible to detect the dot image portion with a higher accuracy.

For example, the dot image portion can be detected with a higher accuracy by changing or setting the window length N and the threshold Value Th in the following manner based on the dot pitch y.

$N = y \times 2 + 2$ $Th = 4$

The dot pitch y (dots) can be obtained from the following formula (4), based on the resolution r (dpi), a number of lines of the dot image (hereinafter referred to as a line number) L (lpi), and a screen angle α (degrees).

$$y = (1/\sin \alpha) \times (r/L) \qquad (4)$$

For example, in the case where the resolution r is r=600 (dpi) used by a monochrome printer, the dot pitch y becomes y=8 (dots) if the line number L is L=106 (lpi) and the screen angle α is α=45 (degrees) In most cases, the screen angle α is 45 (degrees) in monochrome printers, and the line number L is 106 (lpi), 141 (lpi), 212 (lpi) or the like in most cases. Accordingly, if the resolution r is determined, it is possible to obtain a maximum dot pitch y using the line number L of L=106 (lpi) and the screen angle α of α=45 (degrees). The window length N and the threshold value Th may be changed or set as described above based on this maximum dot pitch y.

Figure 14:
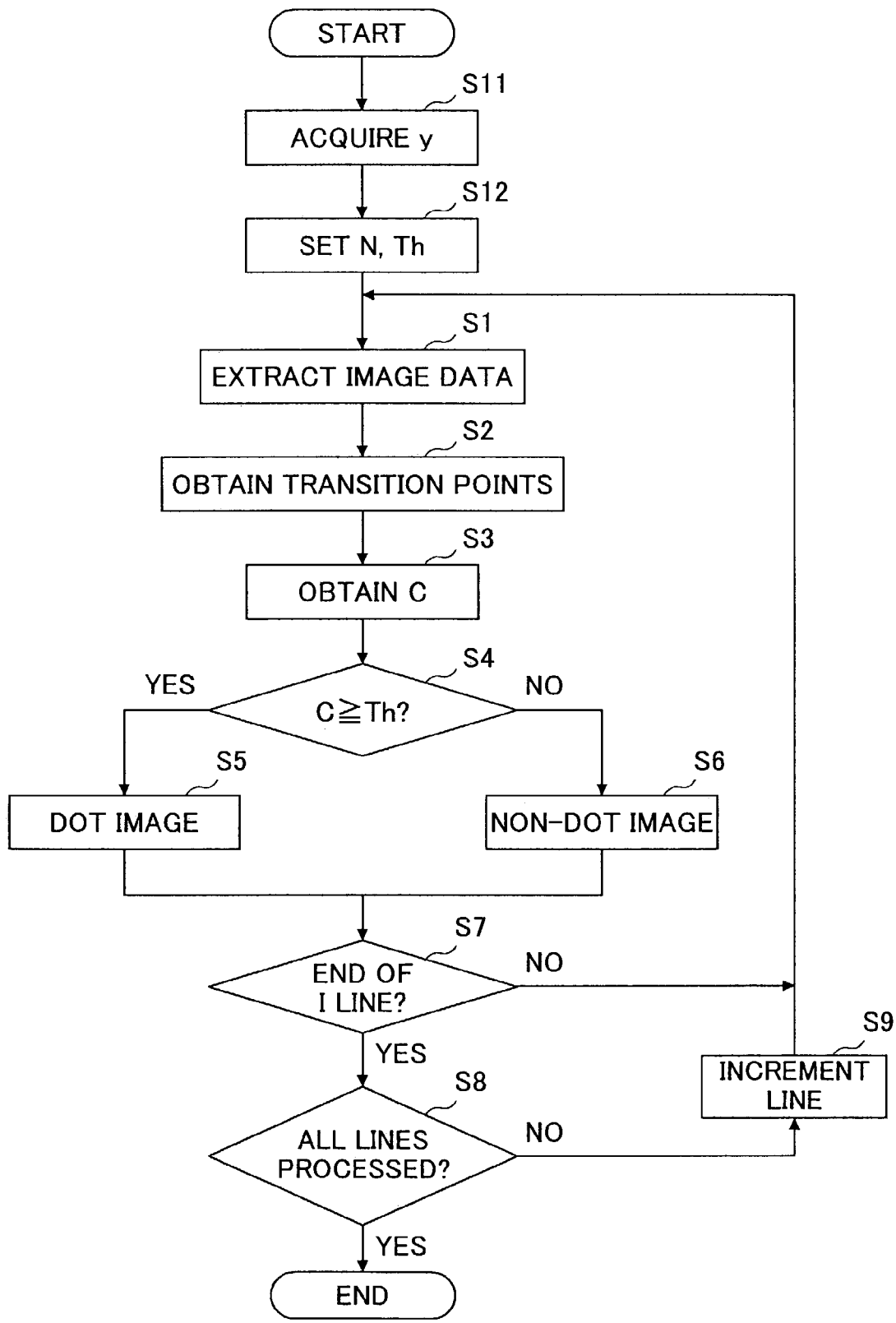
FIG. 14 is a flow chart for explaining an embodiment of a method of detecting the dot image portion used by a dot image portion detector shown in FIG. 13.

FIG. 14 is a flow chart for explaining an embodiment of a method of detecting the dot image portion used by the dot image portion detector 273 shown in FIG. 13. In FIG. 14, those steps which are the same as those corresponding steps in FIG. 4 are designated by the same reference numerals, and a description thereof will be omitted. In FIG. 14, a step S11 acquires the dot pitch y from the controller 103 via the input/output unit 134. A step S12 sets the values of the window length N and the threshold value Th based on the acquired dot pitch y. The process carried out thereafter is the same as that of FIG. 4.

It is desirable to calculate the formula (4) described above in the MPU 131 within the controller 103. However, when calculating the formula (4) within the dot image portion detector 273 within the dot correction unit 107, it is necessary to supply the resolution r, the line number L and the screen angle a from the controller 103 to the dot image portion detector 173 in place of the dot pitch y.

Even for the same line number L, the dot pitch y varies depending on the resolution r. Accordingly, it is possible to accurately detect the dot image portion in accordance with the instructed resolution r, by changing the parameters used for the detection of the dot image portion depending on the resolution r. In this case, the parameters used for the detection of the dot image portion include the dot pitch y, the window length N and the threshold value Th.

The dot image portion detector 273 which detects the dot image portion depending on the dot pitch information, may of course be used in place of the dot image portion detector 173 of the embodiment shown in FIG. 9 or 10.

Next, a description will be given of a fourth embodiment of the image forming apparatus according to the present invention. This fourth embodiment of the image forming apparatus employs a fourth embodiment of the image processing apparatus according to the present invention. The basic structure of this fourth embodiment of the image forming apparatus is the same as that of the second embodiment of the image forming apparatus shown in FIG. 8, and an illustration and description thereof will be omitted. In this embodiment, the present invention is applied to a laser printer, but it is of course possible to similarly apply the present invention to a copying machine, a facsimile machine or the like.

Figure 15:
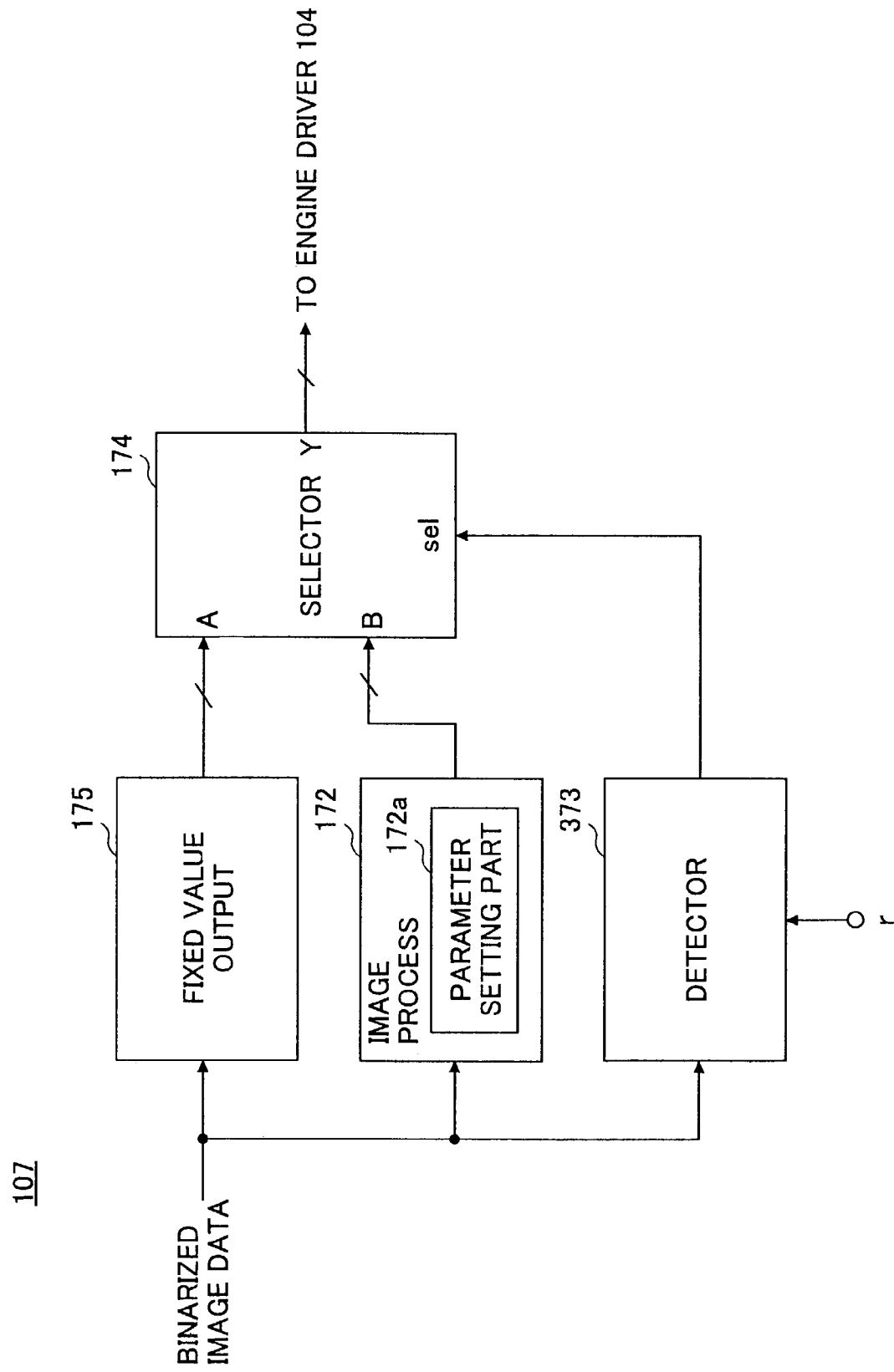
FIG. 15 is a system block diagram showing a structure of an important part of a fourth embodiment of the image forming apparatus according to the present invention.

FIG. 15 is a system block diagram showing a structure of an important part of the fourth embodiment of the image forming apparatus. More particularly, FIG. 15 shows the structure of an embodiment of the dot correction unit 107 shown in FIG. 8. In FIG. 15, those parts which are the same as those corresponding parts in FIG. 13 are designated by the same reference numerals, and a description thereof will be omitted.

In FIG. 15, a dot image portion detector 373 receives the resolution information (resolution r) from the controller 103. The dot image portion detector 373 determines whether or not to detect the dot image portion, depending on the resolution information. In other words, the dot image portion detector 373 detects whether or not the binarized image data is a dot image portion, only when the resolution of the binarized image data is lower than a predetermined value. If the resolution of the binarized image data is greater than or equal to the predetermined value, the dot image portion detector 373 judges that the binarized image data is a non-dot image portion. The detection itself of the dot image portion is similar to the detecting operation of the dot image portion detector 173 shown in FIG. 11. As a result, when the resolution is greater than or equal to the predetermined value, the selector 174 selectively outputs the multi-valued digital image data which is input to the input terminal A from the output terminal Y and in this case, the smoothing is not carried out regardless of whether the binarized image data is a dot image portion or a non-dot image portion.

In general, when the resolution of the binarized image data is greater than or equal to the predetermined value and is 1200 dpi, for example, the effects of the jaggedness is inconspicuous to the human eyes even when no smoothing is carried out. In addition, for such a high resolution, there is a possibility that the dot image portion detector 373 will erroneously detect a dot image portion. On the other hand, when the resolution of the binarized image data is lower than 600 dpi, for example, the jaggedness becomes conspicuous unless the smoothing is positively carried out for the non-dot image portion. Hence, in this embodiment, the dot correction unit 107 is controlled so as not to carry out the detection of the dot image portion when the binarized image data has a high resolution which does not require the smoothing. As a result, it is possible to prevent deterioration of the picture quality caused by erroneous detection of a dot image portion by the dot image portion detector 373.

Figure 16:
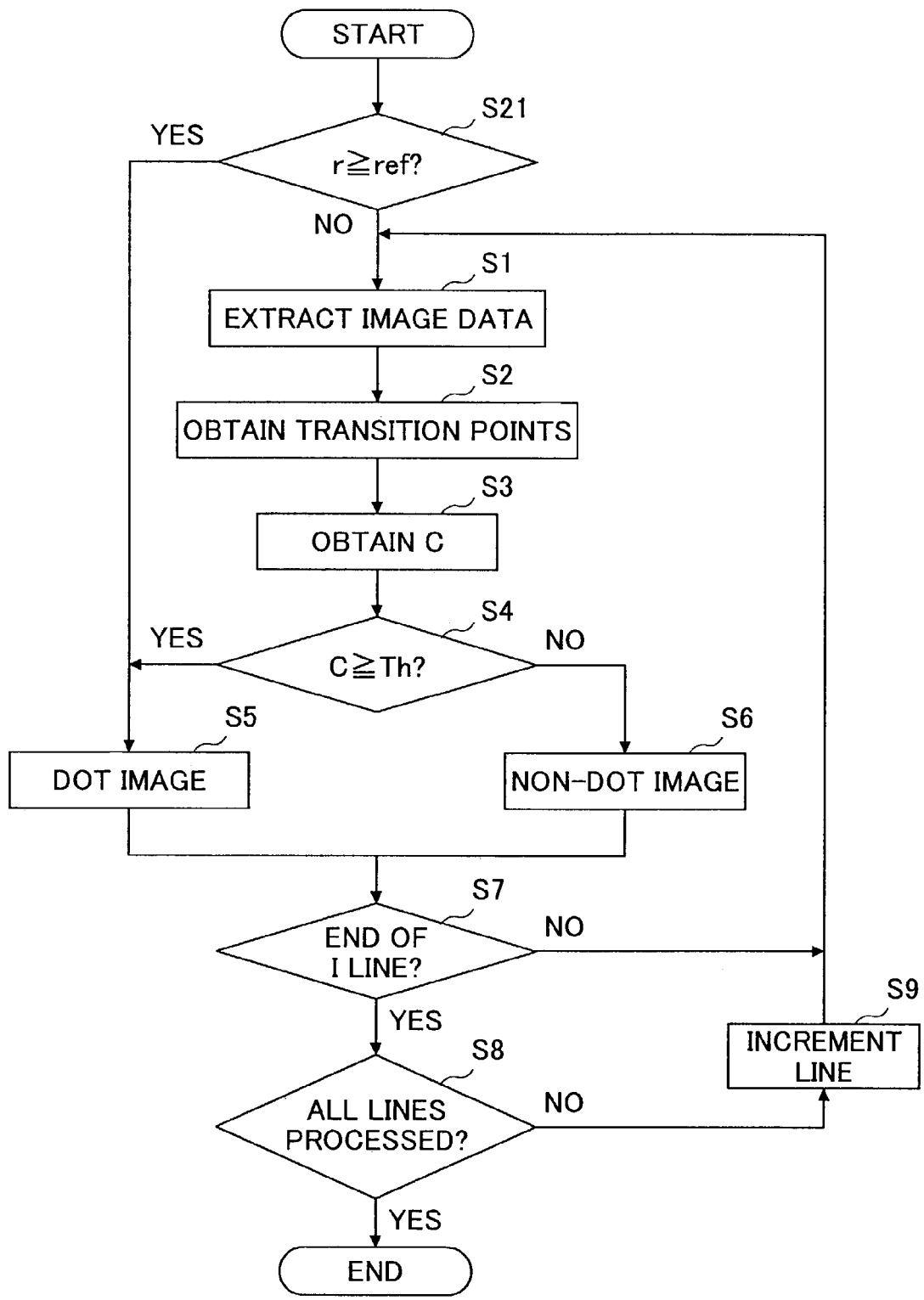
FIG. 16 is a flow chart for explaining a method of detecting the dot image portion used by a dot image portion detector shown in FIG. 15.

FIG. 16 is a flow chart for explaining a method of detecting the dot image portion used by the dot image portion detector 373 shown in FIG. 15. In FIG. 16, those steps which are the same as those corresponding steps in FIG. 4 are designated by the same reference numerals, and a description thereof will be omitted. In FIG. 16, a step S21 decides whether or not the resolution r is greater than or equal to a predetermined value ref. The process advances to the step S1 if the decision result in the step S21 is NO. On the other hand, the process advances to the step S5 if the decision result in the step S21 is YES.

The dot image portion detector 373 which determines whether or not to detect the dot image portion depending on the resolution information, may of course be used in place of the dot image portion detector 173 of the embodiment shown in FIG. 9 or 10.

Figure 17:
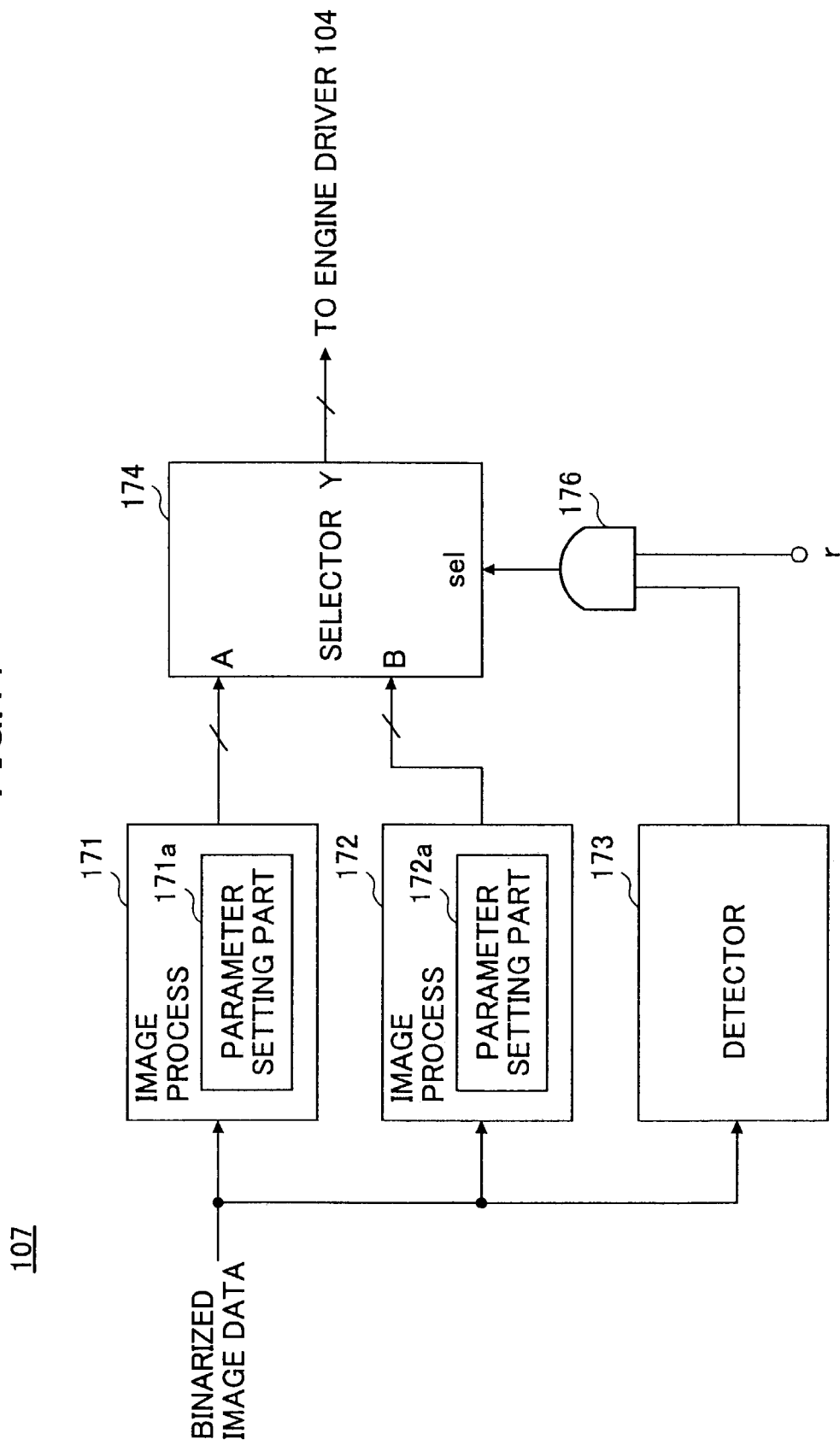
FIG. 17 is a system block diagram showing a modification of the structure of the important part of the fourth embodiment of the image forming apparatus.

The dot image portion detector 373 determines whether or not to detect the dot image portion depending on the resolution. However, it is possible to determine whether or not to detect the dot image portion depending on the resolution, using a structure shown in FIG. 17. FIG. 17 is a system block diagram showing a modification of the structure of the important part of the fourth embodiment of the image forming apparatus. In FIG. 17, those parts which are the same as those corresponding parts in FIG. 10 are designated by the same reference numerals, and a description thereof will be omitted.

In FIG. 17, the dot image portion detector 171 outputs to an AND circuit 176 a signal which becomes "0" when the dot image portion is detected and becomes "1" when the non-dot image portion is detected. The AND circuit 176 also receives from the controller 103 a signal which becomes "0" when the resolution r is greater than or equal to the predetermined value ref and becomes "1" when the resolution r is less than the predetermined value ref. In this case, an output signal of the AND circuit 176 is input to the selection terminal sel of the selector 174 as the selection signal.

A combination of the dot image portion detector 173 and the AND circuit 176, which determines whether or not to detect the dot image portion depending on the resolution information, may be used in place of the dot image portion detector 173 in the embodiment shown in FIG. 9 or, in place of the dot image portion detector 373 in the embodiment shown in FIG. 15.

Next, a description will be given of a fifth embodiment of the image forming apparatus according to the present invention. This fifth embodiment of the image forming apparatus employs a fifth embodiment of the image processing apparatus according to the present invention. The basic structure of this fifth embodiment of the image forming apparatus is the same as that of the second embodiment of the image forming apparatus shown in FIG. 8, and an illustration and description thereof will be omitted. In this embodiment, the present invention is applied to a laser printer, but it is of course possible to similarly apply the present invention to a copying machine, a facsimile machine or the like.

When an attempt is made to detect all of the dot image portions within the image, there is a possibility of detecting extremely small characters and line segments within the image as dot image portions. The switching of the smoothing is made depending on the detection result of the dot image portion, and the picture quality of the dot image portion will not be deteriorated by the detection of the dot image portion. However, when the extremely small characters and line segments are detected as dot image portions, the jaggedness becomes conspicuous at the portions of the extremely small characters and line segments. Accordingly, this embodiment can forcibly disable the detection of the dot image portion in such a case.

Figure 18:
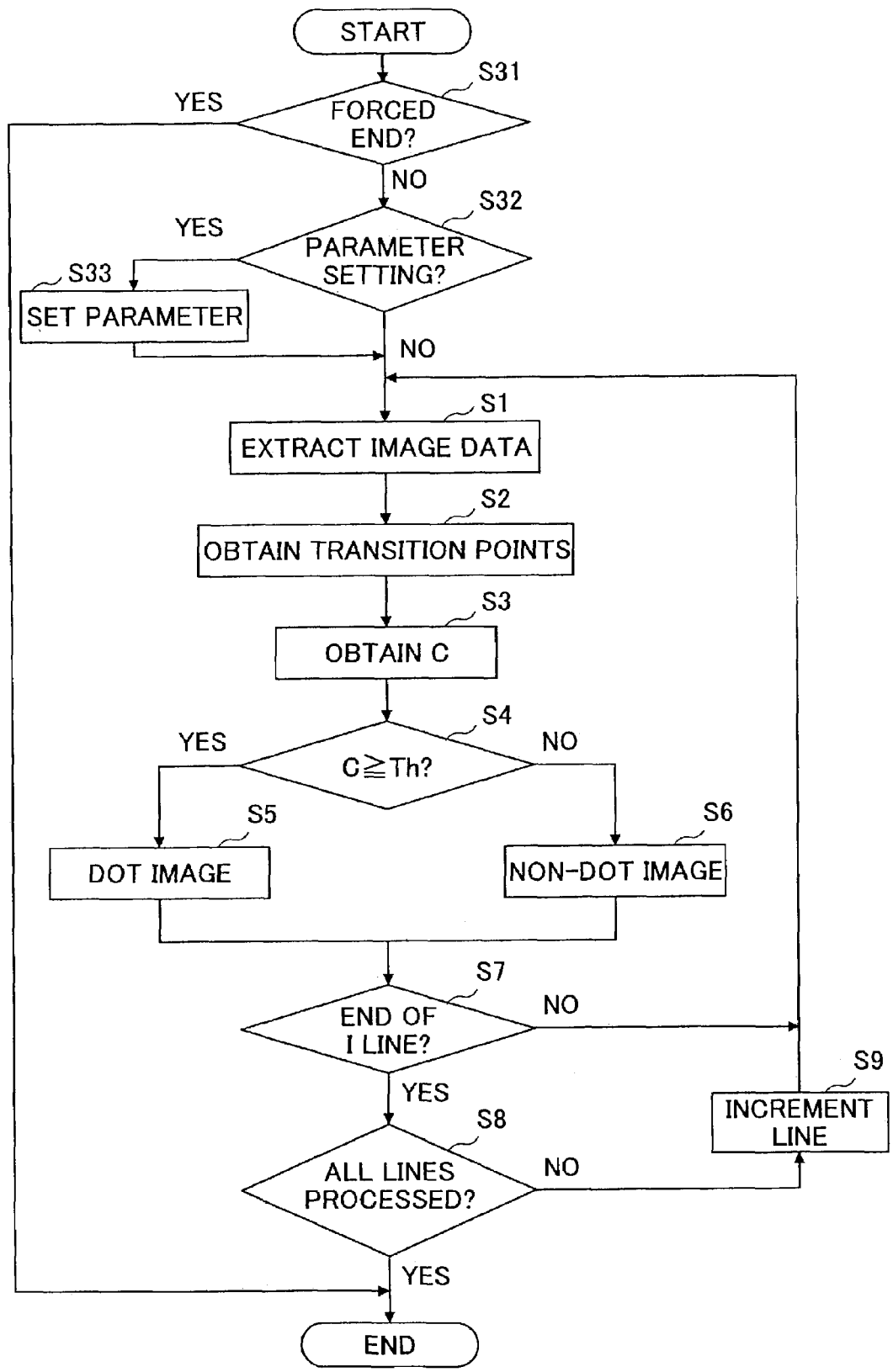
FIG. 18 is a flow chart for explaining another embodiment of the method of detecting the dot image portion used by the dot image portion detector of the fourth embodiment of the image forming apparatus.

FIG. 18 is a flow chart for explaining an embodiment of the method of detecting the dot image portion used by a dot image portion detector within the dot correction unit 107 of the fifth embodiment of the image forming apparatus. In FIG. 18, those steps which are the same as those corresponding steps in FIG. 4 are designated by the same reference numerals, and a description thereof will be omitted. The structure itself of the dot correction unit 107 can basically be realized by any of the structures shown in FIGS. 9, 10, 11, 13, 15 and 17. But in this embodiment, an enable/disable signal input terminal is provided in the dot image portion detector 173, 273 or 373.

In FIG. 18, a step S31 decides whether or not the operator has instructed a forced end of the detecting operation of the dot image portion detector from the operation panel 135. If the decision result in the step S31 is YES, a disable signal is supplied from the controller 103 to the enable/disable signal input terminal of the dot image portion detector 173, 273 or 373, and the process ends. On the other hand, if the decision result in the step S31 is NO, an enable signal is supplied from the controller 103 to the enable/disable signal input terminal of the dot image portion detector 173, 273 or 373, and the process advances to a step S32. The step S32 decides whether or not the operator has instructed the setting or changing of the parameters, such as the window length N, the threshold value Th, the dot pitch y and the resolution r, used for the detection of the dot image portion by the dot image portion detector 173, 273 or 373. If the decision result in the step S32 is YES, a step S33 sets or changes the parameters depending on the operator's instruction. If the decision result in the step S32 is NO or, after the step S33, the process advances to the step S1. The steps S31 through S33 are carried out by the MPU 131 within the controller 103.

The present invention is not limited to the application to black-and-white images or monochrome images, and the present invention is similarly applicable to the processing of images in 2 or more colors and full-color images. In the case of images in two or more colors or full-color, it is possible to obtain effects similar to those obtained by the embodiments described above by carrying out an image processing similar to that of the embodiments described above with respect to the image data of each color.

In the case of a color printer which prints using yellow (Y), magenta (M), cyan (C) and black (K), the smoothing is conventionally carried out only with respect to the image data of black (K), because the picture quality deterioration becomes conspicuous when the smoothing is carried out with respect to the image data of yellow (Y), magenta (M) and cyan (C). However, according to the embodiments described above, it is possible to obtain a similar picture quality improving effect for the binarized image data of each color, even, when the smoothing is carried out not only with respect to the binarized image data of black (K) but also for the binarized image data of yellow (Y), magenta (M) and cyan (C).

In each of the embodiments described above, the image forming section forms the image on the recording medium such as paper. However, the image forming section may form an image on a display part. In other words, the binarized image data which is subjected to the image processing of the present invention may be displayed on the display part, and the present invention is applicable to a display apparatus.

Further, the present invention is not limited to these embodiments, but various variations and modifications may be made without departing from the scope of the present invention.

What is claimed is:

1. An image processing apparatus comprising:
   a detector detecting a dot image portion or a non-dot image portion from a binarized image data representing an image; and
   an image processing section carrying out a different image processing with respect to the binarized image data depending on a detection result of said detector
   wherein said detector detects whether or not the binarized image data is a dot image portion only when a resolution of the binarized image data is lower than a predetermined value, and judges that the binarized image data is a non-dot image portion when the resolution is greater than or equal to the predetermined value.

2. The image processing apparatus as claimed in claim 1, wherein said image processing section carries out a first image processing with respect to the binarized image data when said detector detects the dot image portion, and carries out a second image processing which is different from the first image processing with respect to the binarized image data when said detector detects the non-dot image portion.

3. The image processing apparatus as claimed in claim 1, wherein said image processing section comprises:
   a first image process unit carrying out a first image processing with respect to the binarized image data when said detector detects the dot image portion;
   a second image process unit carrying out a second image processing which is different from the first image processing with respect to the binarized image data when said detector detects the non-dot image portion; and
   a selector selectively outputting an output image data of said first image process unit when said detector detects the dot image portion and outputting an output image data of said second image process unit when said detector detects the non-dot image portion.

4. The image processing apparatus as claimed in claim 2, wherein said first image processing includes a through which passes the binarized image data as is or a smoothing which smoothens the binarized image data, and said second image processing includes a smoothing which smoothens the binarized image data.

5. The image processing apparatus as claimed in claim 4, wherein said first image processing further includes a conversion of the binarized image data into a multi-valued digital image data, and said second image processing further includes a conversion of the binarized image data into a multi-valued digital image data.

6. The image processing apparatus as claimed in claim 1, further comprising:
a setting unit setting at least one of a parameter used for the first image processing and a parameter used for the second image processing.

7. The image processing apparatus as claimed in claim 1, wherein said detector extracts image data from the binarized image data using a window having a size of N×1 pixels with N pixels arranged in a main scan direction, counts transition points of the binarized image data within the window from a first logic value to a second logic value and from the second logic value to the first logic value, and detects the dot image portion if a total number of the transition points is less than or equal to a threshold value Th.

8. The image processing apparatus as claimed in claim 7, wherein the transition points of the binary image data within the window from the first logic value to the second logic value and from the second logic value to the first logic value are detected from an exclusive-OR of the image data extracted from the binarized image data by the window and image data obtained by shifting the extracted image data by 1 pixel.

9. The image processing apparatus as claimed in claim 7, wherein said detector estimates a dot pitch T of the dot image portion, and obtains a window length N and the threshold value Th based on formulas $$N=(T\times n)+2$$

$$Th=2\times n$$

where n is an integer indicating a number of dots completely included within the window.

10. The image processing apparatus as claimed in claim 1, wherein said detector extracts image data from the binarized image data using a window having a size of N×1 pixels with N pixels arranged in a main scan direction, counts transition points of the binarized image data within the window from a first logic value to a second logic value and from the second logic value to the first logic value, and detects the dot image portion if a total number of the transition points is equal to a threshold value Th.

11. The image processing apparatus as claimed in claim 1, wherein said detector detects the dot image portion of the binarized image data based on parameters used for detection of the dot image portion.

12. The image processing apparatus as claimed in claim 11, wherein said detector changes the parameters used for the detection of the dot image portion, based on a dot pitch of the binarized image data.

13. The image processing apparatus as claimed in claim 12, further comprising:
means for obtaining the dot pitch based on a resolution, a number of lines of dot image, and screen angle of the binarized image data.

14. The image processing apparatus as claimed in claim 11, further comprising:
a setting unit setting the parameters used for the detection of the dot image portion.

15. The image processing apparatus as claimed in claim 1, further comprising:
means for enabling or disabling a detecting operation of said detector.

16. The image processing apparatus as claimed in claim 1, wherein said image processing section subjects the binarized image data to the image processing and outputs a multi-valued digital image data.

17. The image processing apparatus as claimed in claim 1, wherein the image is a color image in two or more colors, and said detector and said image processing section carry out detection the image processing with respect to binarized image data of each color.

18. An image forming apparatus comprising:
an image processing apparatus including a detector detecting a dot image portion or a non-dot image portion from a binarized image data representing an image, and an image processing section carrying out a different image processing with respect to the binarized image data depending on a detection result of said detector; and
an image forming section forming an image on a recording medium based on an output of the image processing section
wherein said detector detects whether or not the binarized image data is a dot image portion only when a resolution of the binarized image data is lower than a predetermined value, and judges that the binarized image data is a non-dot image portion when the resolution is greater than or equal to the predetermined value.

19. The image forming apparatus as claimed in claim 18, wherein said image forming section forms the image on a recording medium or a display part.

20. The image forming apparatus as claimed in claim 18, wherein the image processing includes smoothing.

21. An image processing apparatus comprising:
detecting means for detecting a dot image portion or a non-dot image portion from a binarized image data representing an image; and
image processing means for carrying out a different image processing with respect to the binarized image data depending on a detection result of said detecting means
wherein said detecting means detects whether or not the binarized image data is a dot image portion only when a resolution of the binarized image data is lower than a predetermined value, and judges that the binarized image data is a non-dot image portion when the resolution is greater than or equal to the predetermined value.

22. An image processing apparatus comprising:
a detector detecting a dot image portion or a non-dot image portion from a binarized image data representing an image; and
an image processing section carrying out a different image processing with respect to the binarized image data depending on a detection result of said detector,
wherein said detector extracts image data from the binarized image data using a window having a size of N×1 pixels with N pixels arranged in a main scan direction, counts transition points of the binarized image data within the window from a first logic value to a second logic value and from the second logic value to the first logic value, and detects the dot image portion if a total number of the transition points is less than or equal to a threshold value Th, and
said detector estimates a dot pitch T of the dot image portion, and obtains a window length N and the threshold value Th based on formulas $$N=(T\times n)+2$$

$$Th=2\times n$$

where n is an integer indicating a number of dots completely included within the window.

23. An image processing apparatus comprising:
a detector detecting a dot image portion or a non-dot image portion from a binarized image data representing an image; and
an image processing section carrying out a different image processing with respect to the binarized image data depending on a detection result of said detector,
wherein said detector detects the dot image portion of the binarized image data based on parameters used for detection of the dot image portion, and
said detector changes the parameters used for the detection of the dot image portion, based on a dot pitch of the binarized image data.

24. The image processing apparatus as claimed in 23, further comprising:
means for obtaining the dot pitch based on a resolution, a number of lines of dot image, and screen angle of the binarized image data.

* * * * *